US011605376B1

(12) United States Patent
Hoover

(10) Patent No.: US 11,605,376 B1
(45) Date of Patent: Mar. 14, 2023

(54) PROCESSING ORCHESTRATION FOR SYSTEMS INCLUDING MACHINE-LEARNED COMPONENTS

(71) Applicant: Amazon Technologies, Inc., Seattle, WA (US)

(72) Inventor: Thomas Jay Hoover, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 154 days.

(21) Appl. No.: 16/913,436

(22) Filed: Jun. 26, 2020

(51) Int. Cl.
G10L 15/32 (2013.01)
G10L 15/183 (2013.01)
G10L 13/047 (2013.01)

(52) U.S. Cl.
CPC .......... G10L 15/183 (2013.01); G10L 13/047 (2013.01); G10L 15/32 (2013.01)

(58) Field of Classification Search
CPC ...... G10L 15/183; G10L 13/047; G10L 15/32
See application file for complete search history.

(56) References Cited

U.S. PATENT DOCUMENTS

| | | | |
|---|---|---|---|
| 6,556,960 B1 * | 4/2003 | Bishop | G06F 17/18 703/22 |
| 7,216,077 B1 * | 5/2007 | Padmanabhan | G10L 15/065 704/E15.013 |
| 10,255,269 B2 * | 4/2019 | Quirk | G06F 40/263 |
| 10,747,958 B2 * | 8/2020 | Nelson | G06F 40/284 |
| 2006/0074980 A1 * | 4/2006 | Sarkar | G06F 16/958 |
| 2015/0046164 A1 * | 2/2015 | Maganti | 704/260 |
| 2017/0011039 A1 * | 1/2017 | Spaulding | G06F 16/9024 |
| 2019/0340379 A1 * | 11/2019 | Beecham | G06F 21/572 |
| 2020/0193998 A1 * | 6/2020 | Abou Antoun | G06V 40/165 |
| 2020/0249996 A1 * | 8/2020 | Kumar Addepalli | G06N 3/063 |
| 2020/0344185 A1 * | 10/2020 | Singaraju | G06F 16/9024 |
| 2021/0157834 A1 * | 5/2021 | Sivasubramanian | G06F 16/61 707/722 |
| 2021/0383205 A1 * | 12/2021 | Shang | G06F 40/237 |
| 2022/0147570 A1 * | 5/2022 | Fukunaga | G10L 15/08 |

* cited by examiner

Primary Examiner — Neeraj Sharma
(74) Attorney, Agent, or Firm — Pierce Atwood LLP

(57) ABSTRACT

Techniques for implementing a virtual assistant using directed acyclic graphs (DAGs) are described. When a trigger event occurs (e.g., the receipt of a natural language input, the receipt of sensor data, the detection of a performed gesture, etc.), an endpoint of processing of the trigger event is determined. A DAG is then generated that represents processing of the trigger event. Generate of the DAG starts by building a portion of the DAG for the endpoint processing component, and working backward based on data dependencies. Within the DAG, one or more components that output data, but do not receive data output by another component, may be determined. Thereafter, processing of the trigger event may be commences by initiating processing of the determined one or more components.

20 Claims, 25 Drawing Sheets

US 11,605,376 B1

PROCESSING ORCHESTRATION FOR SYSTEMS INCLUDING MACHINE-LEARNED COMPONENTS

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
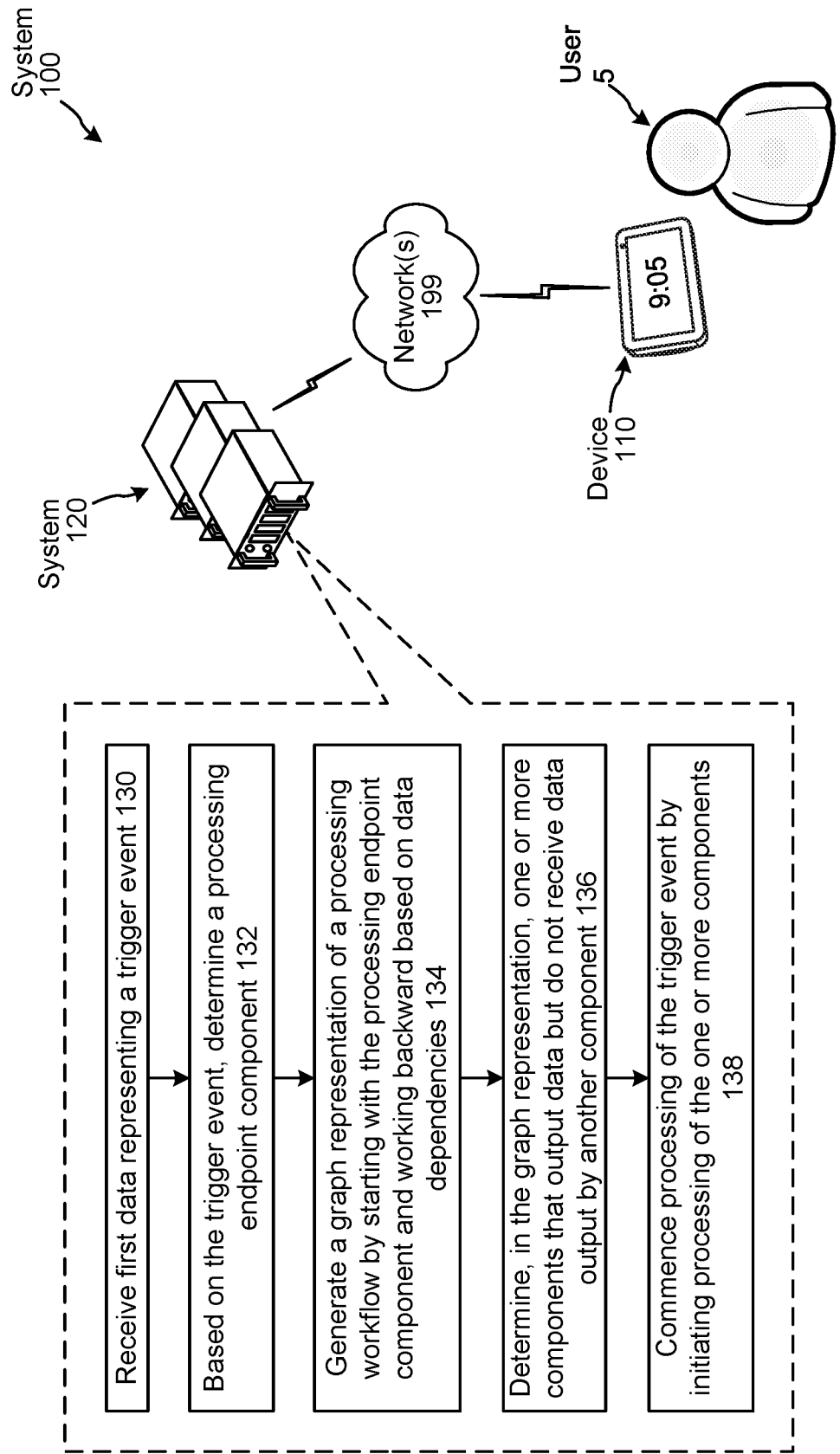
FIG. 1 is a conceptual diagram illustrating a system configured to execute a processing component-based processing workflow, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may be configured to cause actions to be performed in response to natural language user inputs (e.g., spoken and/or text-based natural language inputs). For example, for the natural language input "play workout music," a system may output music from a user's workout playlist. For further example, for the natural language input "turn on the lights," a may turn on "smart" lights associated with a user's profile. In another example, for the natural language input "play my favorite movie," a may output a movie tagged as a favorite movie in a profile of the user. In the foregoing examples, actions correspond to the outputting of music, the turning on of "smart" lights, and the outputting of the movie. Thus, as used herein, an "action" may refer to a result of a system processing a natural language input.

A system orchestrates a processing workflow in order to process a natural language input. In at least some instances, the processing workflow may be implemented in a step-by-step sequential manner. For example, upon receiving audio data representing a spoken natural language input, a system may cause ASR processing to be performed on the audio data to generate ASR output data. Thereafter, the system may cause NLU processing to be performed on the ASR output data to generate NLU output data. As part of that NLU processing, or separately, the may process context information to assist in the NLU processing and/or to re-rank or further process the NLU output data to determine which NLU output data to select for further processing (e.g., which NLU hypothesis is the most probable match to the natural language input). After that, the system may cause the selected NLU output data to be sent to a component (of the system) configured to select a skill to execute with respect to the NLU output data. Then, the system may cause the NLU output data to be sent to the skill to perform an action responsive to the natural language input.

A system's orchestration of a natural language input processing workflow may be coded in a manner that causes components (of the system) to send data to other specific components of the system. When a new component is to be integrated into the processing workflow, the entire (or a significant portion of) the processing workflow may need to be re-factored to coordinate the processing of existing components with that of the new component.

The present disclosure provides, among other things, techniques for constructing a system processing workflow that does not necessarily operate in a sequential manner and indeed sometimes may operate partially in a reverse sequence. Further, the offered system may operate in a manner that permits a new component to be added to the processing workflow without needing to re-factor the processing workflow. A system of the present disclosure may implement a processing component-based processing workflow that defines system components, the data types to be input to the components, and the data types output by the components. However, the processing component-based processing workflow may not require any specific component receive data from or send data to another particular component of the system. Such enables a new component to be integrated into the processing component-based processing workflow without needing to re-factor the processing workflow to indicate from where the new component is to receive data from and to where the new component is to send data to.

At runtime and for example, when the system receives a natural language input, the system may determine a downstream component (e.g., a component that typically operates after another, upstream, component typically operates and/or may potentially be dependent upon at least some data output from the upstream component) that is to process with respect to the natural language input. Upon determining the downstream component, the system may work backward through the processing workflow to construct a directed acyclic graph (DAG) (or other graph representation) representing only a portion of the overall system processing workflow components that are to process the present natural language input. Once the DAG is constructed, the system may determine dependencies of various components in the DAG. In other words, the system may determine a first component may not be able to process until the first component receives a data type output from a second component of the system. Rather than wait for the first component to be called and then call the second component to process (as may be the situation in a system that implements its processing workflow sequentially), a system of the present disclosure may commence processing of the second component prior to calling the first component to process. This may result in decreased processing time as compared to a sequentially implemented processing workflow.

FIG. 1 illustrates a system 100 configured to execute a processing component-based processing workflow. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5) in communication with a system 120 across one or more networks 199. The network(s) 199 may include a local or private network or may include a wide network such as the Internet. While the user 5 is illustrated as a human, other types of users (e.g., computing systems) may exist.

The device 110 may receive audio corresponding to a spoken natural language input of the user 5. The device 110 may generate audio data representing the audio, and may send the audio data to the system 120. Alternatively, the device 110 may receive a text-based (e.g., typed) natural language input from the user 5. The device 110 may generate text data representing the text-based natural language input, and may send the text data to the system 120. In at least some instances, the device 110 may include a camera that captures a sequence of images representing the user 5 performing a gesture. In these instances, the device 110 may send image data (representing the sequence of images) and/or an indication of the gesture performed to the system 120 (and the system 120 may determine the gesture is associated with a particular natural language input in storage). In at least some embodiments, the device 110 may include a motion sensor configured to detect motion. In these embodiments, when the device 110 detects movement, the device 110 may send data representing the detected movement to the system 120 (and the system 120 may determine the detected movement is associated with a particular natural language input in storage). Each of the foregoing (i.e., audio data representing a spoken natural language input, text data representing a text-based natural language input, image or other data representing a performed gesture, and sensor data) may corresponding to a different trigger event as each of the foregoing may commence processing by the system 120.

The system 120 receives (130) first data representing a trigger event. For example, the system 120 may receive audio data representing a spoken natural language input, text data representing the text-based natural language input, image data representing the performance of a gesture, or motion sensor data representing detected motion.

Each trigger event may be associated with a different processing endpoint component. For example, audio data may correspond to a first type of processing endpoint component, text data may correspond to the first or a second type of processing endpoint component, image data may correspond to a third type of processing endpoint component, motion sensor data may correspond to a fourth type of processing endpoint component, etc. The system 120 may determine a type of processing endpoint component based on the trigger event represented in the first data, and may thereafter determine (132) a specific processing endpoint component based on the trigger event represented in the first data (i.e., corresponding to the type of processing endpoint component.

The system 120 may generate (134) a graph representation of a processing workflow by starting with the processing endpoint component and working backward based on data dependencies. For example, the system 120 may build a DAG starting with the processing endpoint component and working backward based on which components need what data and which components provide what data, until a starting point of processing is determined. Generation of such a DAG is described herein with respect to FIG. 11A.

After generating the graph representation, the system 120 may determine (136), in the graph representation, one or more components that output data but do not receive data output by another component. If the graph representation corresponds to a DAG, the system may determine one or more nodes (corresponding to system components) that output data but that do not input data from another node of the DAG.

The system 120 may thereafter commence (138) processing of the trigger event by initiating processing of the one or more components. Such enables the system 120 to decrease user-perceived latency. For example, a Component A may output a first data type but may not input a data type output by another component of the system 120. A Component B may input the first data type and a second data type output by a Component C, which may in turn input a third data type output by a Component D. If the system 120 orchestrated processing of the components in a linear manner, the system 120 would first call Component D, then Component C, then Component B, and then Component A, even though Component A's processing is not dependent on processing of any of the other components. According to the present disclosure, the system 120 may cause Component A to process at least partially in parallel to Component D and/or Component C, but in any event prior to calling Component B to process. As a result, whereas the above-mentioned linear orchestration would result in Component B being called, then Component A being called, and then Component B processing once Component A outputs the first data type, Component B (according to the present disclosure) may process immediately upon being called since Component A (upon which Component B's processing is dependent) was caused to output the first data type prior to Component B being called. Greater decreases in user-perceived latency may be observed as the system 120 frontloads the processing of more components that are not dependent on other component processing. Accordingly, teachings of the present disclosure result in beneficial user experiences.

Figure 2:
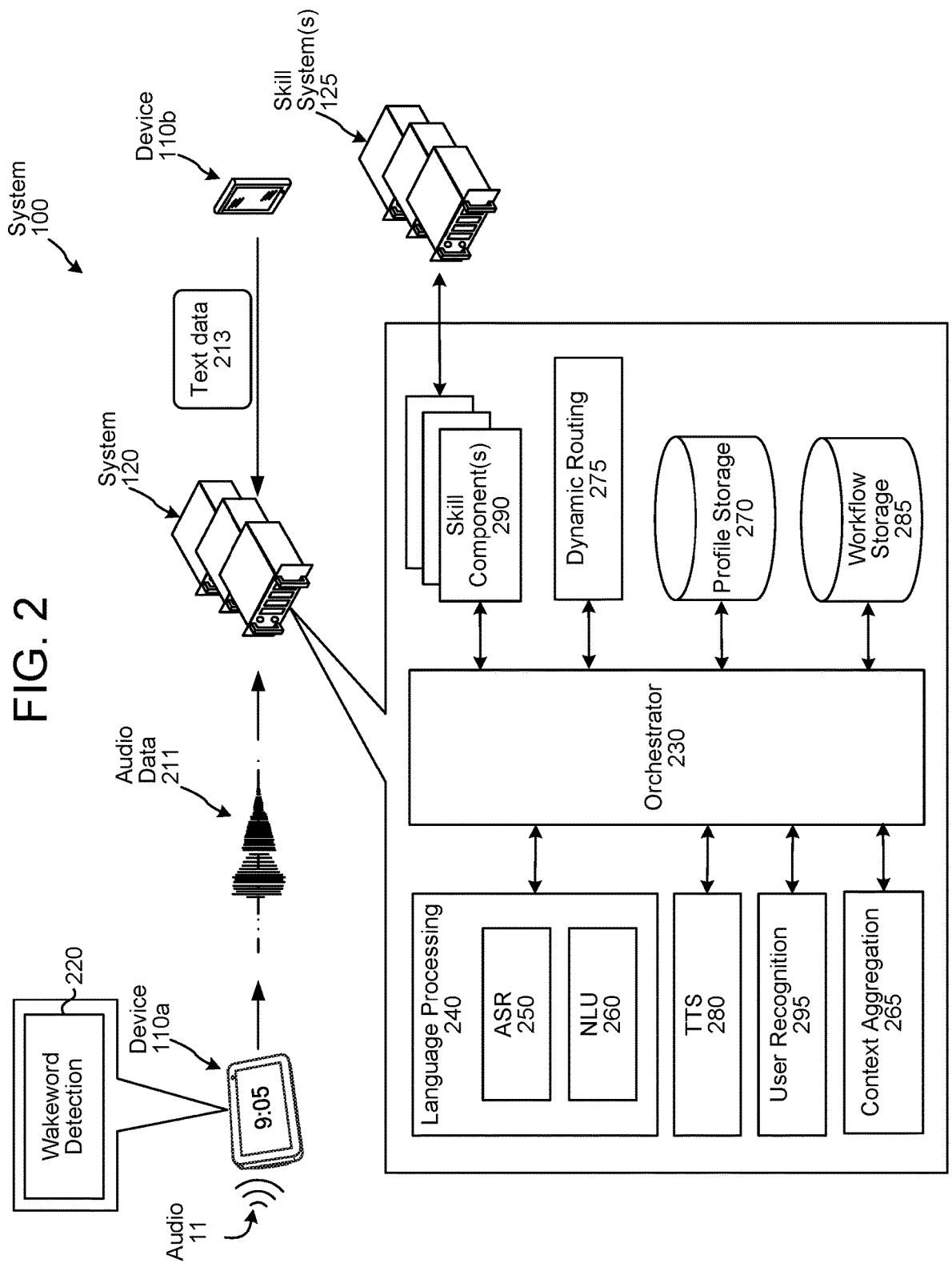
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

An audio capture component(s), such as a microphone or array of microphones of a device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when the user 5 intends to speak an input to the system 120. The device 110a may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110a may "wake" and begin transmitting audio data 211, representing the audio 11, to the system 120. The audio data 211 may include data corresponding to the detected wakeword, or the device 110a may remove the portion of the audio corresponding to the detected wakeword prior to sending the audio data 211 to the system 120.

The system 120 may include an orchestrator component 230 configured to receive the audio data 211 from the device 110a. The system 120 may include a language processing component 240 configured to perform language processing. As used herein, language processing may refer to NLU processing, or a combination of ASR processing and NLU processing.

The orchestrator component 230 may send the audio data 211 to an ASR component 250 that transcribes the audio data 211 into ASR output data including one or more ASR hypotheses. ASR output data may include one or more textual interpretations (corresponding to one or more ASR hypotheses), or may be configured in another manner, such as one or more tokens. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In addition to a device 110a receiving a spoken natural language input, a device 110b may receive a text-based (e.g., typed) natural language input. The device 110b may generate text data 213 representing the typed natural language input, and may send the text data 213 to the system 120, wherein the text data 213 is received by the orchestrator component 230.

Figure 3:
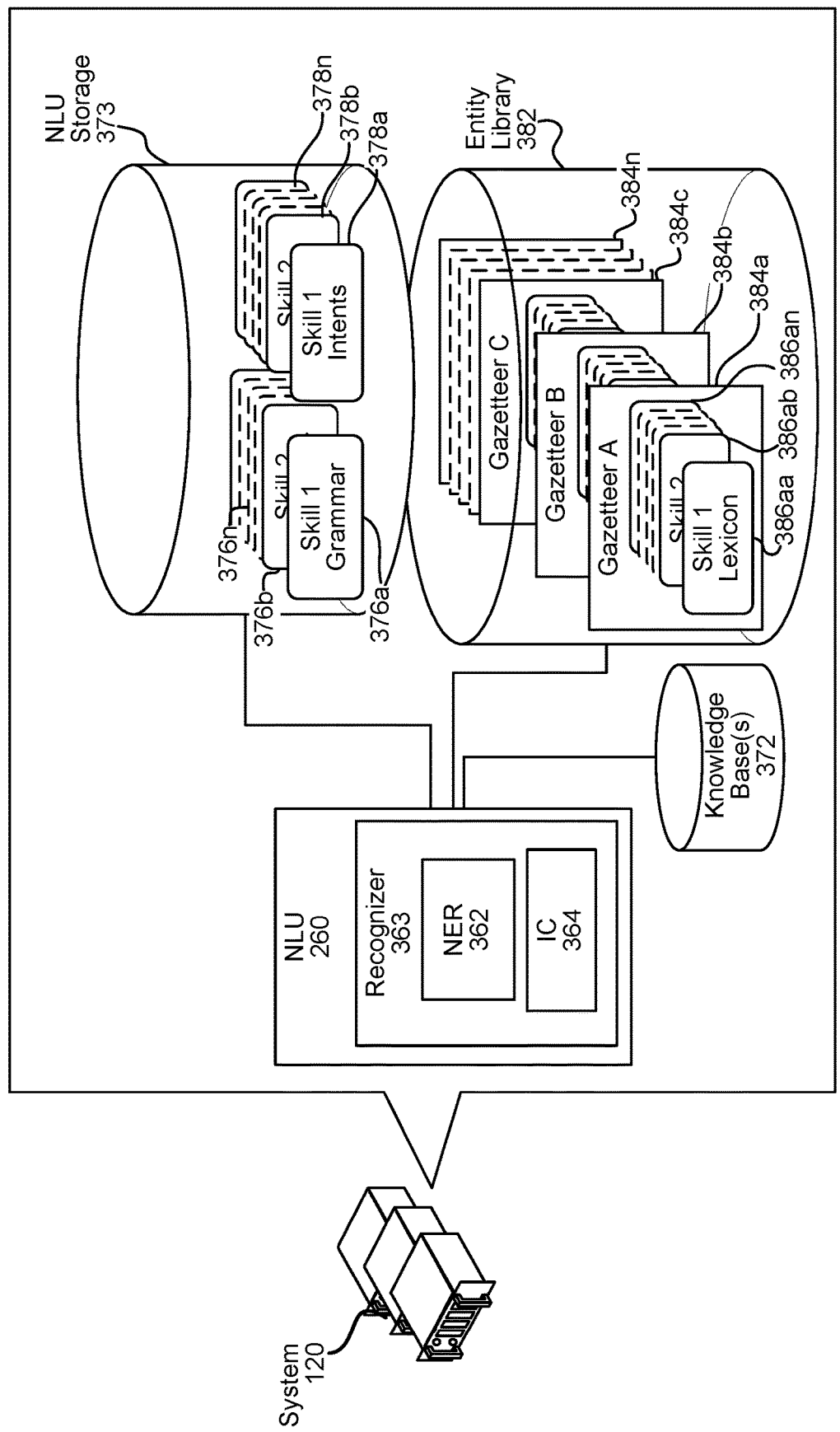
FIG. 3 is a conceptual diagram of how natural language understanding (NLU) processing may be performed, according to embodiments of the present disclosure.
Figure 4:
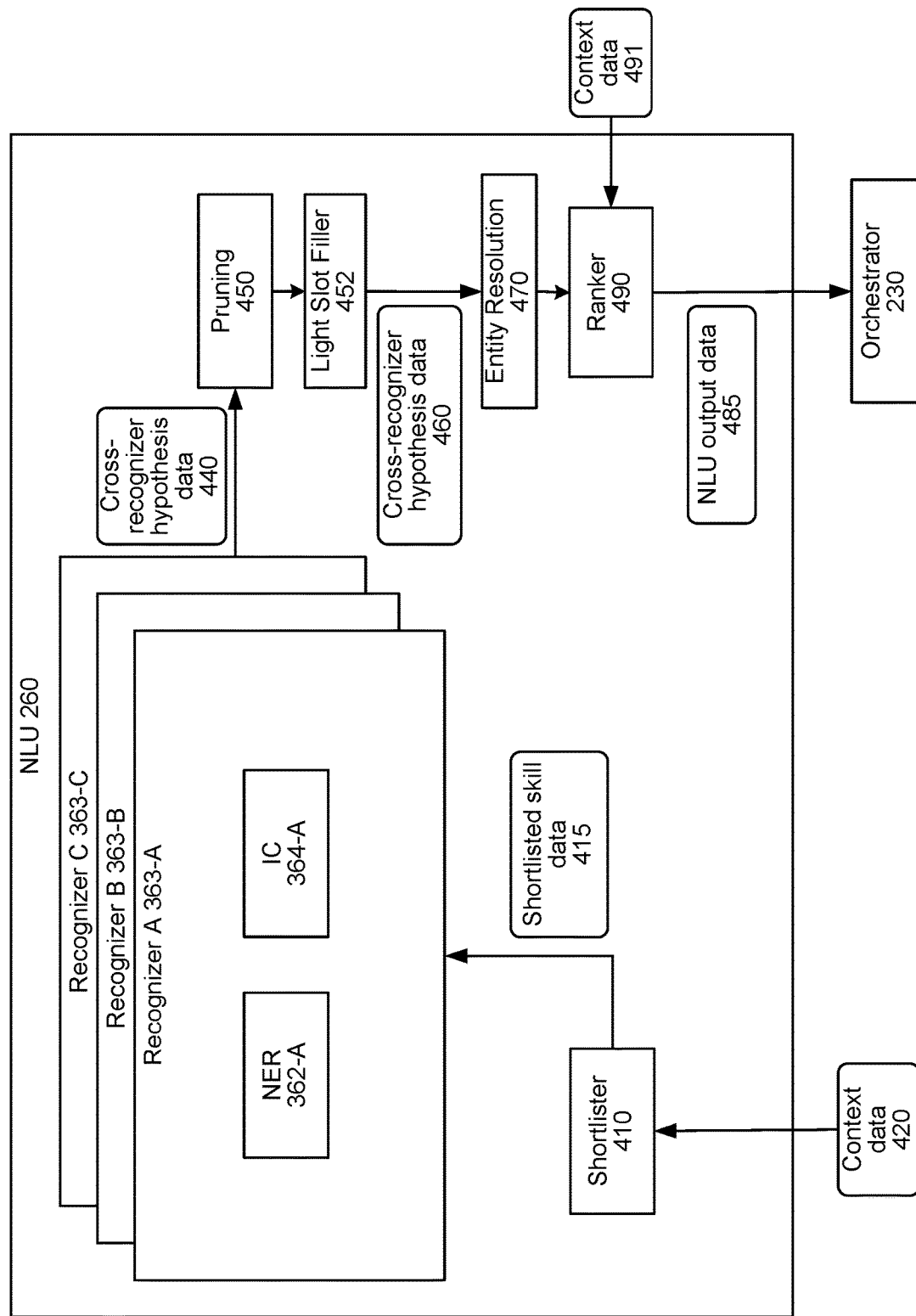
FIG. 4 is a conceptual diagram of how NLU processing may be performed, according to embodiments of the present disclosure.

The orchestrator component 230 may send the text data 213 or ASR output data output by the ASR component 250, depending on the type of natural language input received, to a NLU component 260. FIGS. 3-4 illustrate how the NLU component 260 may perform NLU processing. As used below, a "skill" may refer to a skill component 290, a skill system 125, or a combination of a skill component 290 and corresponding skill system 125.

The NLU component 260 may include one or more recognizers 363. In at least some embodiments, a recognizer 363 may be associated with a skill (e.g., the recognizer may be configured to interpret a natural language input to correspond to the skill). In at least some other embodiments, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and a custom domain.

Recognizers 363 may process in parallel, in series, partially in parallel, etc. For example, a recognizer corresponding to a first domain may process at least partially in parallel to a recognizer corresponding to a second domain. For further example, a recognizer corresponding to a first skill may process at least partially in parallel to a recognizer corresponding to a second skill.

The NLU component 260 may communicate with an NLU storage 373 including skill grammars (376a-376n), representing how natural language inputs may be formulated to invoke skills, and skill intents (378a-378n) representing intents supported by respective skills.

Each recognizer 363 may be associated with a particular grammar 376, one or more particular intents 378, and a particular personalized lexicon 386 (stored in an entity library 382). A gazetteer 384 may include skill-indexed lexical information associated with a particular user. For example, Gazetteer A (384a) may include skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information may improve entity resolution.

Each recognizer 363 may include a named entity recognition (NER) component 362 that attempts to identify grammars and lexical information that may be used to construe meaning with respect to text data/ASR output data input therein. An NER component 362 identifies portions of text data/ASR output data that correspond to a named entity that may be recognizable by the system 120. An NER component 362 may also determine whether a word refers to an entity that is not explicitly mentioned in the text data/ASR output data, for example "him," "her," "it" or other anaphora, exophora or the like.

An NER component 362 applies grammar models 376 and lexical information 386 associated with one or more skills to determine a mention of one or more entities in text data/ASR output data input therein. In this manner, an NER component 362 identifies "slots" (i.e., particular words in text data/ASR output data) that may be needed for later processing. An NER component 362 may also label each slot with a type (e.g., noun, place, city, artist name, song name, etc.).

Each grammar model 376 may include the names of entities (i.e., nouns) commonly found in natural language correcting to a particular skill to which the grammar model 376 relates, whereas lexical information 386 may be personalized to the user identifier output by a user recognition component 295 for the natural language input. For example, a grammar model 376 associated with a shopping skill may include a database of words commonly used when people discuss shopping.

A downstream process called named entity resolution actually links a portion of text data/ASR output data (identified by an NER component 362) to a specific entity known to the system 120. To perform named entity resolution, the NLU component 260 may use gazetteer information (384a-384n) stored in the entity library storage 382. The gazetteer information 384 may be used to match text data/ASR output data (identified by an NER component 362) with different entities, such as song titles, contact names, etc. Gazetteers may be linked to users (e.g., a particular gazetteer may be associated with a specific user's music collection), may be linked to certain skills (e.g., a shopping skill, a music skill, a video skill, a communications skill, etc.), or may be organized in another manner.

Each recognizer 363 may also include an intent classification (IC) component 364 that processes text data/ASR output data to determine an intent(s) of a skill(s) that potentially corresponds to the natural language input represented in the text data/ASR output data. An intent corresponds to an action to be performed that is responsive to the natural language input. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data/ASR output data to the words and phrases in an intents database 378 associated with the skill(s) that is associated with the recognizer 363 implementing the IC component 364.

The intents identifiable by a specific IC component 364 may be linked to one or more skill-specific grammar frameworks 376 with "slots" to be filled. Each slot of a grammar framework 576 corresponds to a portion of text data/ASR output data that an NER component 362 believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may identify words in text data/ASR output data as subject, object, verb, preposition, etc. based on grammar rules and/or models prior to recognizing named entities in the text data/ASR output data. An IC component 364 (implemented by the same recognizer 363 as the NER component 362) may use the identified verb to identify an intent. The NER component 362 may then determine a grammar model 376 associated with the identified intent. For example, a grammar model 576 for a <PlayMusic> intent may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data/ASR output data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data/ASR output data using heuristic grammar rules, or a model may be constructed using techniques such as hidden Markov models, maximum entropy models, log linear models, conditional random fields (CRF), and the like. For example, an NER component 362, implemented by a music skill or music domain recognizer 363, may parse and tag text data/ASR output data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data/ASR output data corresponds to "play songs by the rolling stones," after failing to determine an album name or song name called "songs" by "the rolling stones," the NER component 362 may search a music skill vocabulary for the word "songs." In the alternative, generic words may be checked before the gazetteer information, or both may be tried, potentially producing two different results.

A recognizer 363 may tag text data/ASR output data to attribute meaning thereto. For example, a recognizer 363 may tag "play mother's little helper by the rolling stones" as: {skill} Music, {intent} Play Music, {artist name} rolling stones, {media type} SONG, and {song title} mother's little helper. For further example, a recognizer 363 may tag "play songs by the rolling stones" as: {skill} Music, {intent} Play Music, {artist name} rolling stones, and {media type} SONG.

As described above, more than one recognizer 363 may process with respect to text data/ASR output data representing a single natural language input. In such instances, each recognizer 363 may output at least one NLU hypothesis including an intent indicator (determined by an IC component 364 of the recognizer 363) and at least one tagged named entity (determined by an NER component 362 of the recognizer 363).

The NLU component 260 may include a shortlister component 410 (as illustrated in FIG. 4). The shortlister component 410 selects skills that may execute in response to the natural language input. The shortlister component 410 thus limits downstream, more resource intensive NLU processes to being performed with respect to skills that are likely to execute in response to the natural language input.

Without a shortlister component 410, the NLU component 260 may process text data/ASR output data with respect to every skill of (or in communication with) the system 120, either in parallel, in series, or using some combination thereof. By implementing a shortlister component 410, the NLU component 260 may process text data/ASR output data with respect to only skills that are likely to execute in response to the natural language input. This reduces total compute power and latency attributed to NLU processing.

The shortlister component 410 may include one or more trained models. The model(s) may be trained to recognize various forms of natural language inputs that may be received by the system 120. For example, during a training period, a skill may provide the system 120 with training data representing sample natural language inputs that may be used to invoke the skill. For example, a ride sharing skill may provide the system 120 with training data corresponding to "get me a cab to [location]," "get me a ride to [location]," "book me a cab to [location]," "book me a ride to [location]," etc. The one or more trained models, to be used by the shortlister component 410, may be trained using the training data to determine other potentially related natural language input structures that a user may try to use to invoke the skill. During training, the system 120 may query the skill regarding whether the determined other natural language input structures are permissible to be used to invoke the skill at runtime. The alternate natural language input structures may be derived by one or more trained models during model training and/or may be based on natural language input structures provided by different skills. The skill may also provide the system 120 with training data indicating grammar and annotations. The system 120 may use the training data representing the sample natural language inputs, the determined related natural language input(s), the grammar, and the annotations to train a model that indicates when a runtime natural language input is likely to be directed to/handled by a skill. Each trained model of the shortlister component 410 may be trained with respect to a different skill. Alternatively, the shortlister component 410 may use one trained model per skill type, such as one trained model for weather skills, one trained model for ride sharing skills, etc.

The system 120 may use the sample natural language inputs provided by a skill, and related sample natural language inputs determined during training, as binary examples to train a model associated with the skill. The model associated with the particular skill may then be operated at runtime by the shortlister component 410. For example, some sample natural language inputs may be positive examples (e.g., natural language inputs that may be used to invoke the skill), while other sample natural language inputs may be negative examples (e.g., natural language inputs that may not be used to invoke the skill).

As described above, the shortlister component 410 may include a different trained model for each skill, a different trained model for each skill type, or some other combination of trained model(s). For example, the shortlister component 410 may alternatively include a single model that includes a portion trained with respect to characteristics (e.g., semantic characteristics) shared by all skills. The single model may also include skill-specific portions, with each skill-specific portion being trained with respect to a different skill. Implementing a single model with skill-specific portions may result in less latency than implementing a different trained model for each skill because the single model with skill-specific portions limits the number of characteristics processed on a per skill level.

The portion of the model, trained with respect to characteristics shared by more than one skill, may be clustered based on skill type. For example, a first portion, of the portion trained with respect to multiple skills, may be trained with respect to weather skills; a second portion, of the portion trained with respect to multiple skills, may be trained with respect to music skills; a third portion, of the portion trained with respect to multiple skills, may be trained with respect to travel skills; etc.

Clustering may not be beneficial in every instance because clustering may cause the shortlister component 410 to output indications of only a portion of the skills that the natural language input may relate to. For example, a natural language input may correspond to "tell me about Tom Collins." If the model is clustered based on skill type, the shortlister component 410 may determine the natural language input corresponds to a recipe skill (e.g., a drink recipe) even though the natural language input may also correspond to an information skill (e.g., storing or otherwise having access to information about a person named Tom Collins).

Training the shortlister component 410 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 410 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skills, only the recognizers 363 associated with those skills may process with respect to the natural language input. The selected recognizers 363 may process in parallel, in series, partially in parallel, etc. For example, if the shortlister component 410 determines a natural language input may relate to both a communications skill and a music skill, a recognizer 363 associated with the communications skill may process in parallel, or partially in parallel, with a recognizer 363 associated with the music skill.

The shortlister component 410 may make binary determinations (e.g., yes or no) regarding which skill(s) corresponds to a natural language input. The shortlister component 410 may make such determinations using the one or more trained models described herein above. If the shortlister component 410 implements a single trained model for each skill, the shortlister component 410 may simply run the models that are associated with enabled skills as indicated in a profile (e.g., stored in a profile storage 270 described in further detail below) associated with the device 110 and/or user 5.

The shortlister component 410 may generate shortlisted skill data 415 representing one or more skills that may execute in response to the natural language input. The number of skills represented in the shortlisted skill data 415 is configurable. In an example, the shortlisted skill data 415 may indicate every skill of (or otherwise in communication with) the system 120 as well as represent, for each skill, whether the skill is likely capable of processing in response to the natural language input. In another example, instead of indicating every skill, the shortlisted skill data 415 may only indicate the skills that are likely capable of processing in response to the natural language input. In yet another example, the shortlister component 410 may implement thresholding such that the shortlisted skill data 415 may indicate no more than a maximum number of skills that may process in response to the natural language input.

In at least some embodiments, the shortlister component 410 may generate a score representing how likely a skill is to process in response to a natural language input. In such embodiments, the shortlisted skill data 415 may only include identifiers of skills associated with scores meeting or exceeding a threshold score.

In the situation where the ASR component 250 outputs ASR output data including more than one interpretation of a natural language input, the shortlister component 410 may output different shortlisted skill data 415 for each interpretation. Alternatively, the shortlister component 410 may output a single instance of shortlisted skill data 415 that represents skills corresponding to the different ASR interpretations.

As indicated above, the shortlister component 410 may implement thresholding such that the shortlisted skill data 415 may indicate no more than a threshold number of skills (e.g., may include no more than a threshold number of skill identifiers). If the ASR component 250 outputs ASR output data including more than one interpretation of a natural language input, the shortlisted skill data 415 may indicate no more than a threshold number of skills irrespective of the number of interpretations output by the ASR component 250. Additionally or alternatively, the shortlisted skill data 415 may indicate no more than a threshold number of skills for each interpretation (e.g., indicating no more than five skills for a first interpretation, no more than five skills for a second interpretation, etc.).

In addition to making a binary determination regarding whether a skill may process in response to a natural language input, the shortlister component 410 may generate scores representing likelihoods that skills may process in response to the natural language input. If the shortlister component 410 implements a different trained model for each skill, the shortlister component 410 may generate a different confidence score for each skill-specific trained model that is run by the shortlister component 410. For example, if the shortlister component 410 runs the models of every skill of (or otherwise in communication with) the system 120, the shortlister component 410 may generate a respective confidence score for each skill of (or otherwise in communication with) the system 120. For further example, if the shortlister component 410 only runs models specific to skills that are indicated as enabled in a profile associated with the device 110 and/or user 5 (as stored in the profile storage 270), the shortlister component 410 may only generate a respective confidence score for each enabled skill. For further example, if the shortlister component 410 implements a single trained model with skill-specific portions, the shortlister component 410 generate a respective confidence score for each skill who's specifically trained portion is run. The shortlister component 410 may perform matrix vector modification to obtain confidence scores for skills.

An example of shortlisted skill data 415 including confidence scores may be represented as:
Search skill, 0.67
Recipe skill, 0.62
Information skill, 0.57
As indicated, the confidence scores output by the shortlister component 410 may be numeric values. The confidence scores output by the shortlister component 410 may alternatively be binned values (e.g., high, medium, low).

The shortlister component 410 may consider context data 420 when determining which skills may process in response to a natural language input. The context data 420 may be embedded (e.g., character embedded) prior to being input to the shortlister component 410.

The context data 420 may include usage history data associated with the device 110 and/or user 5. For example, a confidence score of a skill may be increased if natural language inputs captured by the device 110 and/or originating from the user 5 routinely relate to the skill. Conversely, a confidence score of a skill may be decreased if natural language inputs captured by the device 110 and/or originated from the user 5 rarely relate to the skill.

The context data 420 may indicate the skills that are enabled with respect to the device 110 and/or user 5 (e.g., as represented in the profile storage 270). The shortlister component 410 may use such data to determine which skill-specific trained models to run. That is, the shortlister component 410 may determine to only run the trained models associated with enabled skills. The shortlister component 410 may alternatively use such data to alter skill confidence scores represented in the shortlisted skill data 415.

As an example, considering two skills, one enabled and another unenabled, the shortlister component 410 may run a first model (or model portion) specific to the unenabled skill as well as a second model (or model portion) specific to the enabled skill. The shortlister component 410 may initially determine a confidence score of 0.60 for each of the skills. The shortlister component 410 may then alter those confidence scores based on which skill is enabled. For example, the shortlister component 410 may increase the confidence score associated with the enabled skill and/or decrease the confidence score associated with the unenabled skill.

A user 5 may provide the system 120 with indications of which skills are enabled (e.g., authorized to execute using data associated with the user 5). Such indications may be stored in the profile storage 270. The shortlister component 410 may determine whether profile data, associated with the user 5 and/or device 110, includes indications of enabled skills.

The context data 420 may indicate a type of the device 110. The type of the device 110 may represent the input/output capabilities of the device 110. For example, a device 110 may include a display, may be headless (e.g., displayless), may be mobile or stationary, may include audio playback capabilities, may include a camera, etc. The shortlister component 410 may use such context data 420 to determine which skill-specific trained models (or portions of a model) to run. For example, if the device 110 corresponds to a displayless type of device, the shortlister component 410 may determine not to run trained models (or portions of a model) specific to skills that output video data. The shortlister component 410 may alternatively use such context data 420 to alter skill confidence scores represented in the shortlisted skill data 415.

As an example, considering two skills, one that outputs audio data and another that outputs video data, the shortlister component 410 may run a first model (or first portion of a model) specific to the skill that generates audio data as well as a second model (or second portion of a model) specific to the skill that generates video data. The shortlister component 410 may initially determine a confidence score of 0.60 for each of the skills. The shortlister component 410 may then alter the original confidence scores based on the type of the device 110. For example, if the device 110 is a displayless device, the shortlister component 410 may increase the confidence score associated with the skill that generates audio data and/or decrease the confidence score associated with the skill that generates video data.

The device type, represented in the context data 420, may represent output capabilities of a device 110 to be used to output content to the user 5, which may not necessarily be the device 110 that captured the natural language input. For example, a displayless device 110 may receive a natural language input corresponding to "play Game of Thrones". The system 120 may determine a smart TV, or other device including or otherwise associated with a display, is to be used to output multimedia content (e.g., audio and video) corresponding to the title "Game of Thrones".

The context data 420 may indicate the device 110's speed, location, or other mobility data. For example, the device 110 may correspond to a vehicle including a display. If the vehicle is moving, the shortlister component 410 may decrease the confidence score associated with a skill that generates video data as it may be undesirable to output video content to the user 5 while in a moving vehicle. The vehicle may output data to the system 120 indicating when the vehicle is in motion.

The context data 420 may indicate a currently invoked skill (e.g., a skill that was being used to output content to the user 5 when the device 110 received the natural language input). For example, the user 5 may speak a first natural language input causing the system 120 to invoke a music skill to output music to the user 5. As the music is being output, the system 120 may receive a second natural language input. The shortlister component 410 may use such context data 420 to alter skill confidence scores represented in the shortlisted skill data 415. For example, the shortlister component 410 may run a first model (or a first portion of model) specific to a first skill as well as a second model (or second portion of a model) specific to a second skill. The shortlister component 410 may initially determine a confidence score of 0.60 for each of the skills. The shortlister component 410 may then alter the original confidence scores based on the first skill being invoked to output content while the second natural language input was received. Based on the first skill being invoked, the shortlister component 410 may increase the confidence score associated with the first skill and/or decrease the confidence score associated with the second skill.

The thresholding implemented with respect to the shortlisted skill data 415, and the different types of context data 420 considered by the shortlister component 410, are configurable. For example, the shortlister component 410 may update confidence scores as more context data 420 is considered.

The shortlister component 410 may cause the NLU component 260 to execute only a subset of the recognizers 363 associated with skills represented in the shortlisted skill data 415 as being likely to process in response to the natural language input. If the shortlister component 410 generates the shortlisted skill data 415 to include confidence scores, the shortlister component 410 may cause the NLU component 260 to execute only recognizers 363 associated with skills associated with confidence scores satisfying (e.g., meeting or exceeding) a condition (e.g., a threshold confidence score).

The NLU component 260 may aggregate NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, one or more skills, etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones
[0.70] Intent: <PlayVideo> VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses according to their respective scores. The pruning component 450 may then perform score thresholding with respect to the cross-recognizer hypothesis data 440. For example, the pruning component 450 may select NLU hypotheses associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 650 is to create a reduced list of NLU hypotheses so that downstream, more resource intensive, processes may only operate on NLU hypotheses that most likely represent the natural language input.

The NLU component 260 may include a light slot filler component 452 that takes text data, represented in the NLU hypotheses output by the pruning component 450, and alters it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text data is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill, domain, etc. to which a NLU hypothesis relates. For example, for a travel skill-specific NLU hypothesis, the entity resolution component 470 may transform text data corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text data. Referring to the example natural language input "play songs by the stones," the entity resolution component 470 may reference a personal music catalog, Amazon Music account, user profile, or the like. The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill to perform an action responsive to the natural language input. The NLU component 260 may include multiple entity resolution components that are each specific to one or more different skills, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also context data 491.

The context data 491 indicate skill ratings or popularities. For example, if a skill has a high rating, the ranker component 490 may increase the score of a NLU hypothesis associated with that skill, and vice versa.

The context data 491 may indicate skills that have been enabled by the user 5. For example, the ranker component 490 may assign higher scores to NLU hypotheses associated with enabled skills than to NLU hypotheses associated with skills that have not been enabled by the user 5.

The context data 491 may indicate a system usage history (e.g., specific to the user 5), such as if the user 5 regularly invokes a particular skill or does so at particular times of day. The context data 491 may indicate a present date, a present time, a location of the device 110, weather data, a type of the device 110, user preferences, as well as other context data. For example, the ranker component 490 may consider when any particular skill is currently active with respect to the present user 5 and/or device 110 (e.g., music being output by the skill when the current natural language input is received).

The ranker component 490 may output NLU output data 685 including one or more NLU hypotheses. The NLU component 260 may send the NLU output data 285 to the orchestrator component 230.

As described above, the system 120 may perform speech processing using two different components (e.g., the ASR component 250 and the NLU component 260). One skilled in the art will appreciate that the system 120, in at least some embodiments, may implement a SLU component configured to process audio data 211 to generate NLU output data 485.

In some examples, the SLU component may be equivalent to a combination of the ASR component 250 and the NLU component 260. Yet, the SLU component may process audio data 211 and directly generate the NLU output data 485, without an intermediate step of generating ASR output data. As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. The SLU component may output a most likely NLU hypothesis, or multiple NLU hypotheses associated with respective confidence or other scores (such as probability scores, etc.).

Figure 5:
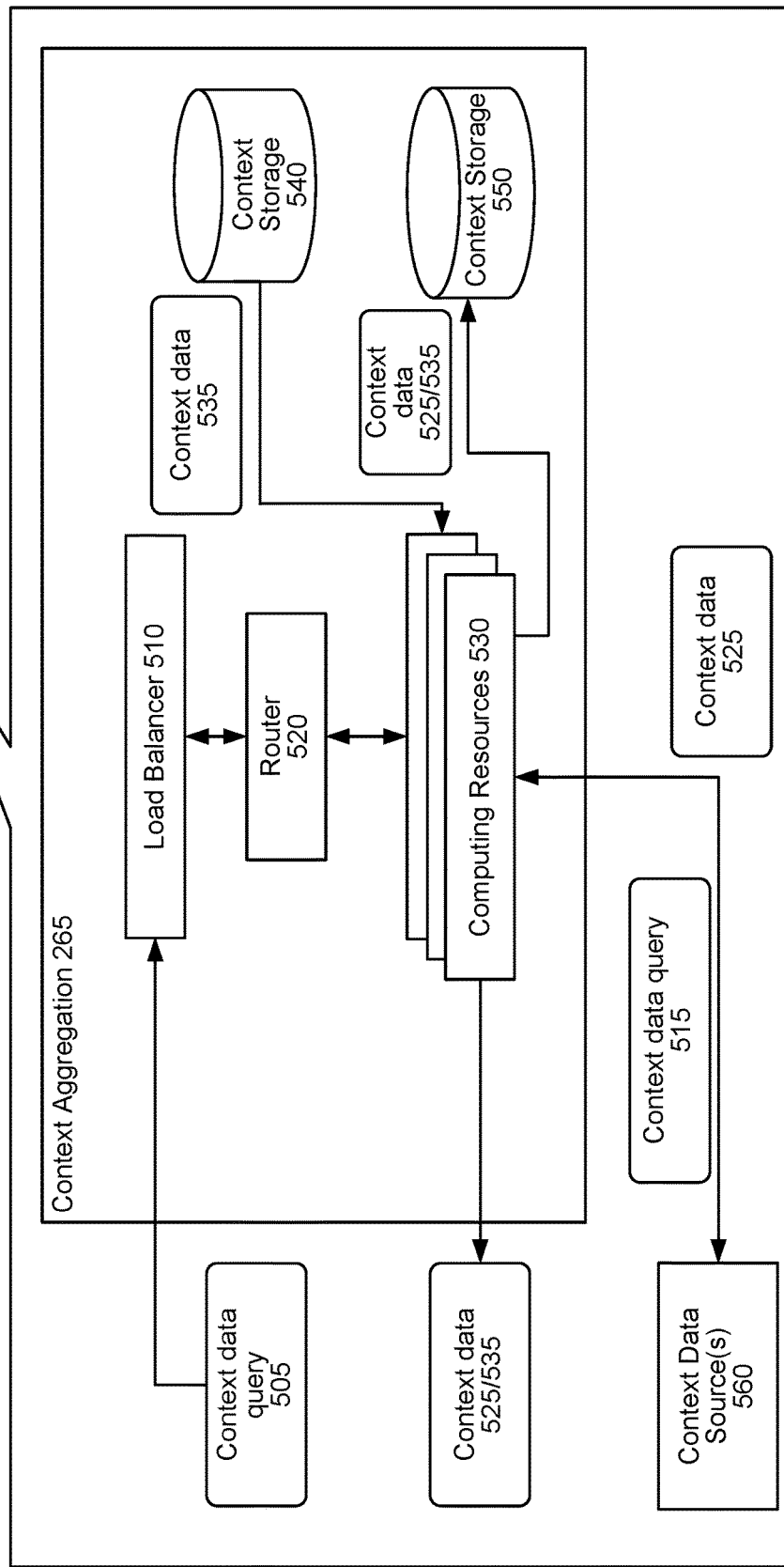
FIG. 5 is a conceptual diagram illustrating components for aggregating context data, according to embodiments of the present disclosure.

The system 120 may include a context aggregation component 265 (illustrated in FIGS. 2 and 5). The context aggregation component 265 may aggregate context data from various sources. FIG. 5 illustrates how the context aggregation component 265 may process in response to a context data query 505 requesting context data corresponding to a particular natural language input.

The context data query 505 may be sent to a load balancer 510. The load balancer 510 may assign the context data query 505 to one or more computing resources 530 based on a present load of the computing resources 530.

The context aggregation component 265 may receive multiple context data queries associated with the same natural language input. Moreover, more than one of these context data queries may be received by the context aggregation component 265 between a time when one or more computing resources 530 are called to process with respect to one of the context data queries and when the one or more computing resources 530 outputs the requested context data. The context aggregation component 265 may include a router 520 that acts as a secondary load balancer to the load balancer 510. That is, the router 520 may determine one or more computing resources 530 are currently processing to aggregate context data associated with the natural language input associated with the context data query 505. If none of the computing resources 530 are currently processing as such, the router 520 may let the load balancer 510's assignment stand. Conversely, if the router 520 determines one or more computing resources 530 are currently aggregating the requested context data, the router 520 may reassign the context data query 505 to those one or more computing resources 530. The foregoing decisions of the router 520 may be based on job statuses associated with processes performed by one or more computing resources 530. This prevents the computing resources 530 from duplicating queries to the same context data source(s) 560, for the same context data (e.g., thereby decreasing load on downstream context data sources 560). Moreover, as a result of such reassignment, the computing resources 530 are able to output context data, in response to multiple context data queries, even if processing for one context data query began prior to receipt of a second context data query requesting the same context data. As a result, context data may be provided to the source of the second context data query faster than if the computing resources 530 separately called one or more context data sources 560 in response to the second context data query.

The computing resources 530 may be associated with a preconfigured data framework of entities and relationships (or may have a plurality of preconfigured data frameworks). The data framework may be generated offline, and used by the computing resources 530 at runtime. For example, a data framework may represent a device 110 is associated with a user 5. The user 5 may be associated with one or more endpoint devices. The user 5 may also be associated with a group that includes various users. A data framework may also include nodes representing substance of the natural language input.

The one or more computing resources 530 (either determined by the load balancer 510 or the router 520) may use an entity or natural language input parameter (represented in the context data query 505) as a starting point to traverse the data framework to determine different types of related entities. For example, if the context data query 505 requests data associated with a particular user identifier, the one or more computing resources 530 may determine one or more endpoint device identifiers associated with the user identifier, a group identifier associated with the user identifier, and/or one or more other user identifiers associated the group identifier.

The one or more computing resources 530 may determine, for each entity, at least one context data source 560. The context data source(s) 560 may have access to various types of context data including, for example, data representing which users of the system 120 are subscribed to one or more pay-for services of the system 120, data representing IP addresses associated with devices from which natural language inputs were received, data representing electronic calendar events, data representing types of music a particular user 5 has listened to over a previous amount of time (e.g., the last 30 days), data representing demographic information of users (e.g., birthdate, gender, education, etc. as represented in user profiles) etc. In general, the context data source(s) 560 may provide context data that may be used by various components of the system 120 in performing their respective processes. A context data source 560 may be a storage containing context data, or may be a computer processing component in communication with such a storage. While FIG. 5 illustrates the context data source(s) 560 being implemented by the system 120, one skilled in the art will appreciate that a portion or all of the context data source(s) 560 may not be implemented by, but may be in communication with, the system 120. In at least some instances, a skill may be a context data source 560. Moreover, a profile storage 270 (of the system 120) may be a context data source 560.

The one or more computing resources 530 may send a context data query 515 to each determined context data source 560. The context data query 515, sent to a particular context data source 560, may represent one or more entity identifiers for each of the one or more entity types determined while traversing the data framework. The identifiers may correspond to one or more device identifiers, one or more user identifiers, one or more natural language input identifiers, etc. The one or more computing resources 530 may receive context data 525 from each queried context data source 560.

The one or more computing resources 530 may also query context storage 540 for context data 535 prefetched with respect to the natural language input, user 5, and/or device 110 (e.g., queried from context data sources 560 once the system determined the user identifier and/or device identifier of the user 5 and/or device 110, respectively, but prior to a component of the system 120 requesting such context data). The one or more computing resources 530 may query context storage 540 with respect to the same identifier(s) that the one or more computing resources send to the context data source(s) 560.

The one or more computing resources 530 may store the context data (525/535) in context storage 550. The context data stored in context storage 550 may represent a source (e.g., a context data source 560) from which the context data was received, one or more identifiers of the one or more computing resources 530 used to obtain the context data, a type of the context data, etc.

The one or more computing resources 530 may also send the context data (525/535) to the component(s) of the system 120 that originated context data queries requesting the context data. In some examples, the one or more computing resources 530 may send the context data (525/535) to the orchestrator component 230, which may route the context data (525/535) to the system 120 component(s) that requested the context data.

The context data (525/535) may be sent to the system 120 component that originated the context data query 505. The context data (525/535) may also be sent to one or more system 120 components that sent context data queries (requesting the same or similar context data as the context data query 505) after the context data query 505 was received, but prior to the context data (525/535) being received by the context aggregation component 265 (e.g., context data queries reassigned by the router 520).

The aggregation of context data, as described with respect to FIG. 5, may occur more than once with respect to a single natural language input. For example, the context aggregation component 265 may receive a first query for context data to be used to perform ASR processing with respect to a natural language input, a second query for context data to be used to perform NLU processing with respect to the natural language input, a third query for context data to be used to select a skill to execute with respect to the natural language input, a fourth query for context data to be used by the skill to perform an action responsive to the natural language input, etc. For further example, the context aggregation component 265 may receive a first query for context data to be used to perform NLU processing of a natural language input by a first NLU domain, a second query for context data to be used to perform NLU processing of the natural language input by a second NLU domain, etc.

In at least some examples, the context aggregation component 265 may associate received context data with a corresponding natural language input identifier for later recall. For example, when the context aggregation component 265 prefetches context data to be used for ASR processing, the context aggregation component 265 may associate the context data with a corresponding natural language input identifier. Thereafter, if the ASR component 250 requests context data for the natural language input identifier, the context aggregation component 265 is able to recall the appropriate context data (e.g., the context data associated with the natural language input identifier) from storage. For further example, when the context aggregation component 265 prefetches context data to be used for NLU processing, the context aggregation component 265 may associate the context data with a corresponding natural language input identifier. Thereafter, if the NLU component 260 requests context data for the natural language input identifier, the context aggregation component 265 is able to recall the appropriate context data from storage. Other examples are possible.

The context aggregation component 265 may receive queries for context data for different natural language inputs and for different stages of natural language input processing. The context aggregation component 265 may also receive published events, such as those representing a user has recently enabled a skill. The context aggregation component 265 may obtain context data when the context aggregation component 265 anticipates context data may be used during processing of a natural language input. For example, in response to receiving a published event representing a user has recently enabled a skill, the context aggregation component 265 may obtain context data that may be used by the skill to process a natural language input provided by the user.

Figure 6:
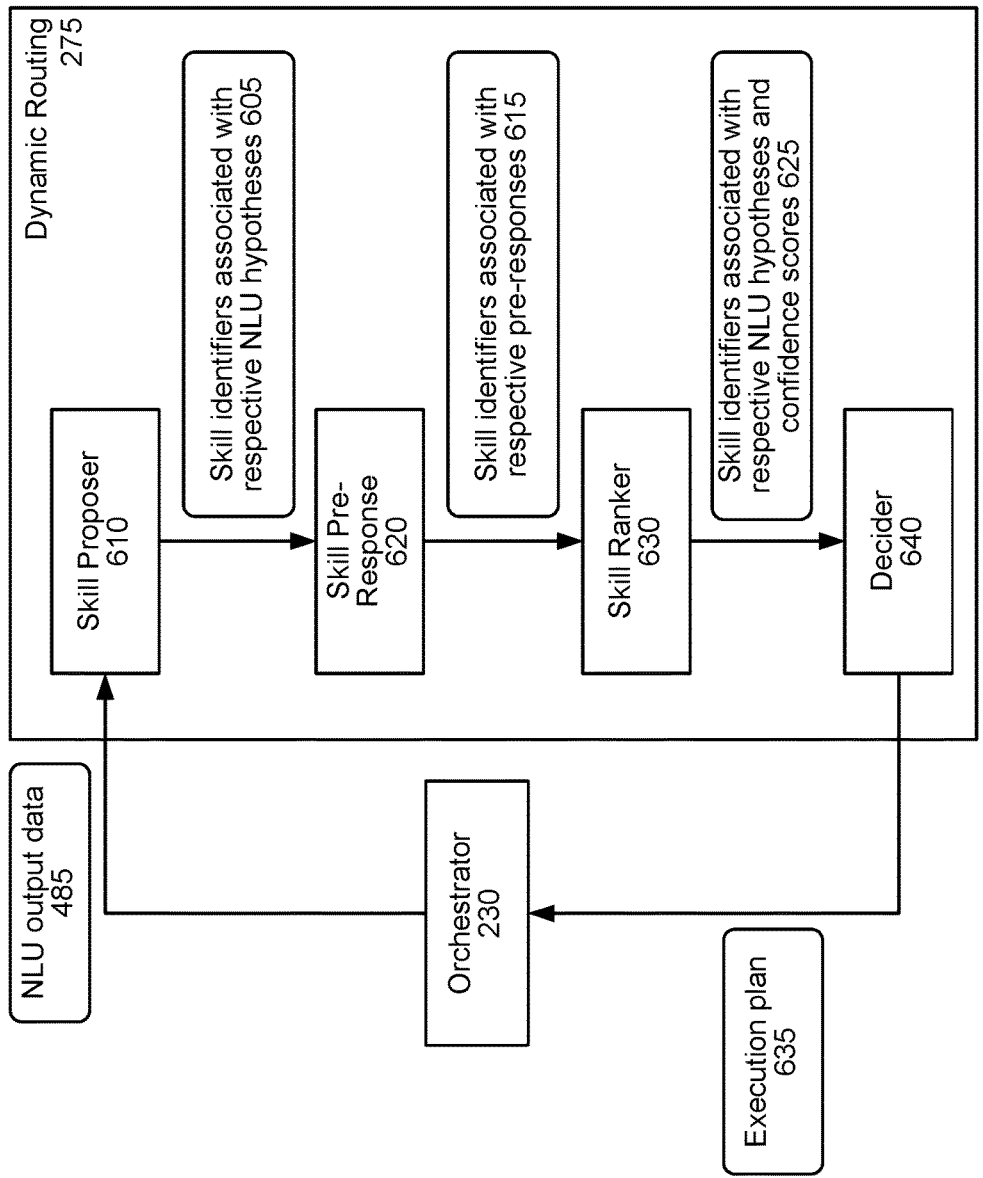
FIG. 6 is a conceptual diagram illustrating how dynamic selection of a skill component may be performed at runtime, according to embodiments of the present disclosure.

The system 120 may include a dynamic routing component 275 (illustrated in FIGS. 2 and 6). The dynamic routing component 275 may determine which NLU hypothesis most accurately represents the natural language input, as well as determine which skill is to execute in response to the natural language input.

As illustrated in FIG. 6, the dynamic routing component 275 may include a skill proposer 610 configured to determine skills capable of processing in response to the natural language input. The skill proposer 610 may receive NLU output data 485 representing the natural language input. In at least some embodiments, the skill proposer 610 may receive the NLU output data 485 from the orchestrator component 230 (as illustrated in FIG. 6).

The skill proposer 610 may also receive context data corresponding to the natural language input. For example, the context data may indicate (1) a skill that was causing the device 110 to output content (e.g., music, video, synthesized speech, etc.) when the device 110 captured the natural language input, (2) one or more skills that are indicated as enabled in a profile (as stored in the profile storage 270) associated with the user 5, (3) output capabilities (which may be represented as a device type identifier) of a device (which may or may not be the same device as the device 110 that captured the natural language input) to be used to output a response to the natural language input, (4) a geographic location of the device 110 (e.g., as represented in a profile in the profile storage 270), (5) an operation mode of the device to be used to output a response to the natural language input (e.g., data indicating whether the device presently corresponds to a "do not disturb" status, whether the device is enabled to be used for 1-way messaging functionality of the system 120, whether the device is enabled to be used for 2-way communication functionality of the system 120, whether the device is enabled to output announcement content, etc.), (6) ASR output data, (7) various user preferences, user profile data, and/or other context data available to the system 120 and corresponding to the natural language input. In at least some embodiments, the skill proposer 610 may receive the context data in response to the skill proposer 610 causing a context data query 505 to be sent to the context aggregation component 265.

The skill proposer 610 may determine skill proposal rules. A skill developer (via a skill developer device) may provide the system 120 with rules data, corresponding to one or more rules, representing when the skill developer's skill should be called to execute. In at least some embodiments, such a rule may be specific to an NLU intent. In such embodiments, if a skill component 125 is configured to execute with respect to multiple intents, the skill may be associated with more than one rule (e.g., each rule corresponding to a different intent capable of being handled by the skill). In addition to being specific to an intent, a rule may indicate one or more entities identifiable by an NER component 362, one or more entity identifiers capable of being output by the entity resolution component 470, and/or context to which a natural language input may correspond. For example, a rule may indicate output capabilities of a device, a geographic location, an operation mode of a device (e.g., that a device needs to be enabled to be used for 1-way messaging functionality of the system 120, that a device needs to be enabled to be used for 2-way communication functionality of the system 120, that a device needs to be enabled to output announcement content, etc.), and/or other context data. The system 120 may associate a skill's identifier with each rule corresponding to the skill. As an example, the system 120 may store rule data indicating a video skill may execute when a natural language input corresponds to a <PlayVideo> intent and the device (to be used to output a response to the natural language input) includes (or is otherwise associated with) a display. As another example, the system 120 may store rule data indicating a music skill may execute when a natural language input corresponds to a <PlayMusic> intent and music is being output by a device when the device captures a natural language input. It will be appreciated that other examples are possible. The foregoing rules enable skills to be selectively proposed at runtime (e.g., based on NLU entities, NLU entity resolution identifiers, and context data) in systems where multiple skills are configured to execute with respect to a same NLU intent.

The skill proposer 610 may, using the received context data and the foregoing described skill proposal rules, generate data 605 representing skills configured to process in response to the natural language input. Thus, in at least some embodiments, the skill proposer 610 may be implemented as a rules engine. In at least some embodiments, the skill proposer 610 may make binary (e.g., yes/no, true/false, etc.) determinations regarding whether a skill is configured to process in response to the natural language input. For example, the skill proposer 610 may determine a skill is configured to process, in response to the natural language input, if the skill is associated with a rule corresponding to the NLU output data 485 (e.g., corresponding to an intent (and optionally one or more entities and/or entity resolution identifiers) represented in the received NLU output data 485) and the received context data.

In at least some embodiments, the skill proposer 610 may generate data 605 representing such binary determinations made with respect to all skills implemented by (or otherwise in communication with) the system 120. In at least some embodiments, the skill proposer 610 may generate data 610 representing such binary determinations made with respect to only a portion of the skills implemented by (or otherwise in communication with) the system 120 (for example only skills indicated as enabled in the received context data).

The skill proposer 610 may output data 605 including skill identifiers and associated NLU output data. For example, each skill identifier, in the data 605, may be associated with one or more NLU hypotheses (represented in the NLU output data 485). The skill proposer 610 may simply make binary determinations (as described above); as such, the skill proposer 610 may not make any confidence determinations, and the skill identifiers may not be associated with confidence values in the data 605. An illustrative example of the data 605, that may be output by the skill proposer 610, may be represented as:

Skill Identifier: 1ds532 Intent: <PlayMusic> AlbumName: GameOfThrones

Skill Identifier: jfdlk828 Intent: <PlayVideo> VideoTitle: GameOfThrones

Skill Identifier: 434klll3 Intent: <PlayVideo> VideoTitle: GameOfThrones with the "Intent: <PlayMusic> Album Name: GameofThrones" and "Intent: <PlayVideo> VideoTitle: GameofThrones" portions of the data 605 corresponding to NLU output data.

In at least some embodiments, the shortlister component 410 (of the NLU component 260) and the skill proposer 610 may both be implemented by the system 120. In such instances, the shortlister component 410 and the skill proposer 610 may process with respect to different skills. For example, in at least some embodiments, the shortlister component 410 may process with respect to skill systems 125 in communication with the system 120 (e.g., illustrated in FIG. 2 as being outside of the system 120), and the skill proposer 610 may process with respect to skill components 290 implemented by the system 120 (e.g., illustrated in FIG. 2 as a component box within the system 120). In such embodiments, skill identifiers output by the shortlister component 410 (and associated NLU output data) may be merged with the skill identifiers and associated NLU output data (output by the skill component proposer 610), and the merged data may be input to a skill pre-response component 620 of the dynamic routing component 275. Alternatively, the skill identifiers and associated NLU output data (output by the shortlister component 410), and the skill identifiers and associated NLU output data (output by the skill proposer 610) may be separately sent to the skill pre-response component 620.

The data 605, output by the skill proposer 610, may be received by a skill pre-response component 620 of the dynamic routing component 275 (either directly or indirectly from the skill proposer 610). The skill pre-response component 620 may be configured to query skills for pre-responses. A pre-response may represent how a skill may process if called to respond to the natural language input, and may optionally include a variety of other data representing a strength of the skill's response. In at least some embodiments, this other data may correspond to context data available to the skill but not the context aggregation component 265 (e.g., this context data may be stored in one or more storages in communication with the skill but not the context aggregation component 265). For example, a pre-response may indicate a skill can personalize a response using profile data accessible to the skill (and may indicate the types of profile data accessible); a pre-response may indicate a skill can respond but cannot personalize the response; a pre-response may indicate a user does not have a subscription with the skill, but that the skill can respond using free functionality of the skill; etc.

The skill pre-response component 620 may send a pre-response query to each skill associated with a skill identifier output by the skill proposer 620. The skill pre-response component 620 may determine, in the received data 605, a portion of NLU output data associated with a particular skill identifier. Thereafter, the skill pre-response component 620 may send, to a skill corresponding to the skill identifier, a pre-response query including the portion of the NLU output data associated with the skill's identifier.

A skill may determine, based on received NLU output data and other data available to the skill, whether the skill is able to respond to the natural language input. For example, a skill may generate a pre-response indicating the skill can respond to the natural language input, indicating the skill may be able to respond to the natural language input (e.g., the indicating the skill needs more data to determine whether the skill can respond to the natural language input), or indicating the skill cannot respond to the natural language input (e.g., due to the skill experiencing a high processing load).

In situations where a skill's pre-response indicates the skill can or may be able to respond to the natural language input, the pre-response may also include various other data representing a strength of the skill's potential response to the natural language input. Such other data may correspond to data available to the skill but not the context aggregation component 265 of the system 120. Such other data may positively influence the skill's runtime ranking as described herein below. For example, such other data may indicate capabilities (e.g., output capabilities or components such as availability of a connected screen, loudspeaker, etc.) of a device to be used to output the skill's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 5 already has a profile and/or subscription with the skill; that the user 5 does not have a subscription with the skill, but that there is a free trial/tier the skill is offering; with respect to a taxi skill, a cost of a trip based on start and end locations, how long the user 5 would have to wait to be picked up, etc.; and/or other data available to the skill that is related to the skill's processing of the natural language input. In at least some embodiments, a skill's pre-response may include a flag (or other indicator) representing a strength of the skill's ability to personalize its response to the user 5.

In at least some embodiments, a skill's pre-response may be configured to a schema pre-defined by the system 120. By the system 120 requiring pre-responses to conform to a specific schema (e.g., by requiring skills to only be able to provide certain types of data in pre-responses), the system 120 may onboard new skills into the dynamic routing functionality described herein without needing to reconfigure the dynamic routing component 275 each time a new skill is onboarded. Moreover, requiring pre-responses to conform to a schema limits the amount of values needed to be used to train and implement a machine learned model for ranking skills at runtime, as described herein below.

The skill pre-response component 620 may receive pre-response data from the queried skills. The skill pre-response component 620 may determine a portion of the received pre-response data corresponding to skills capable of responding to the natural language input. In other words, the skill pre-response component 620 may determine a portion of received pre-responses indicating the associated skill(s) can respond to the natural language input, or may be able to respond if the skill gets more data.

Thereafter, the skill pre-response component 620 may output data 615 including skill identifiers and associated pre-response. This data 615 may not include skill identifiers, and associated pre-responses, corresponding to skills that indicated they could not respond to the natural language input. Thus, a skill's pre-response, which indicates the skill cannot respond to the natural language input, may effectively operate as a way for the skill to prevent itself from being invoked at runtime to respond to the natural language input.

The data 615, output by the skill pre-response component 620, may be received by a skill ranker 630 of the dynamic routing component 275 (either directly or indirectly from the skill pre-response component 620). The skill ranker 630 may be configured to rank skills using a machine learned model. In at least some embodiments, the machine learned model may be built on a deep neural network (DNN).

At runtime the skill ranker 630 may receive the data 615 including skill identifiers and associated pre-responses. The skill ranker 630 may also receive context data corresponding to the natural language input. Such context data may indicate, for example, one or more user preferences of the user 5 (as represented in a user profile or group profile stored in the profile storage 270), one or more domains corresponding to the natural language input, one or more intents representing the natural language input, NER slot values as represented in the NLU output data 485, a measure of success of entity resolution performed with respect to the natural language input, text representing the natural language input, rankings of individual NLU hypotheses in the NLU output data 485, a type of the device 110 that received the natural language input, a type of the device 110 that is to be used to output a response to the natural language input, whether the device 110 (that received the natural language input) was outputting audio when the natural language input was received, whether the device 110 (that received the natural language input) was outputting video when the natural language input was received, and/or other context data available to the system 120. In at least some embodiments, the skill ranker 630 may receive the context data by causing a context data query 505 to be input to the context aggregation component 265.

Using a machine learned model, the skill ranker 630 may process the skill pre-responses and the context data to generate confidence scores for skills represented in the data 615 output by the skill pre-response component 620. Things that may increase a skill's ranking include, for example, that the skill is associated with a pre-response indicating the skill can generate a response (to the natural language input) that is personalized to the user 5, that an NLU hypothesis corresponding to the skill is ranked highly in the NLU hypotheses output by the NLU component 260, that the skill corresponds to a music skill and the device 110 was outputting music when the natural language input was received, that the skill corresponds to a video skill and the device 110 was outputting video when the natural language input was received, etc. Things that may decrease a skill's ranking include, for example, that the skill is associated with a pre-response indicating the skill cannot generate a response (to the natural language input) that is personalized to the user 5, that an NLU hypothesis corresponding to the skill is ranked low in the NLU hypotheses output by the NLU component 260, that the skill corresponds to a video skill and the device 110 was outputting music when the natural language input was received, that the skill corresponds to a music skill and the device 110 was outputting video when the natural language input was received, etc. Other examples are possible and will depend on the context data available to the skill ranker 630.

The skill ranker 630 may output data 625 including skill identifiers associated with respective NLU hypotheses and confidence scores. In at least some embodiments, the skill ranker 630's processing may affect scores (e.g., confidence scores) associated with the skill component identifiers, but not affect scores (e.g., confidence scores) generated by the NLU component 260. An illustrative example of the data 625, that may be output by the skill ranker 630, may be represented as:

[0.85] Skill Identifier: 12dfrads532 Intent: <PlayMusic> AlbumName: GameOfThrones

[0.62] Skill Identifier: jfdlk828 Intent: <PlayVideo> VideoTitle: GameOfThrones

[0.55] Skill Identifier: 434klll3 Intent: <PlayVideo> VideoTitle: GameOfThrones with the "Intent: <PlayMusic> Album Name: GameofThrones" and "Intent: <PlayVideo> VideoTitle: GameofThrones" portions of the data 625 corresponding to NLU hypotheses.

A decider component 640 (of the dynamic routing component 275) may receive the data 625 from the skill ranker 630 (either directly or indirectly). The decider component 640 is configured to generate an execution plan 635 based on the data 625. For example, an execution plan 635 may include the top ranked skill identifier and associated NLU hypothesis represented in the data 625, along with an instruction to invoke the skill (corresponding to the top-ranked skill identifier) to respond to the natural language input. In response to receiving such an execution plan 635, the orchestrator component 230 may invoke the skill (corresponding to the top-ranked skill identifier) by sending the NLU hypothesis to the skill along with an instruction to generate a response. For further example, an execution plan 635 may indicate further data is needed from the user 5 in order for the dynamic routing component 275 to adequately determine which skill should be invoked. In response to receiving such an execution plan 635, the orchestrator component 230 may engage the user 5 to gather the further needed data (e.g., by causing the device 110 to output synthesized speech and/or visual content requesting the further data, and the device 110 capturing one or more further natural language inputs corresponding to the further needed data). It will be appreciated that the foregoing are merely illustrative execution plans 635 and subsequent processing, and that the decider 640 may output other execution plans 635 causing other processing without departing from the present disclosure.

Referring again to FIG. 2, the system 120 may include one or more skill components 290 and/or may communicate with one or more skill systems 125 via one or more skill components 290. A skill component 290, skill system 125, and a combination of a skill component 290 and skill system 125 may be referred to herein as a "skill." A skill may be configured to execute with respect to NLU output data 485. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

Figure 7:
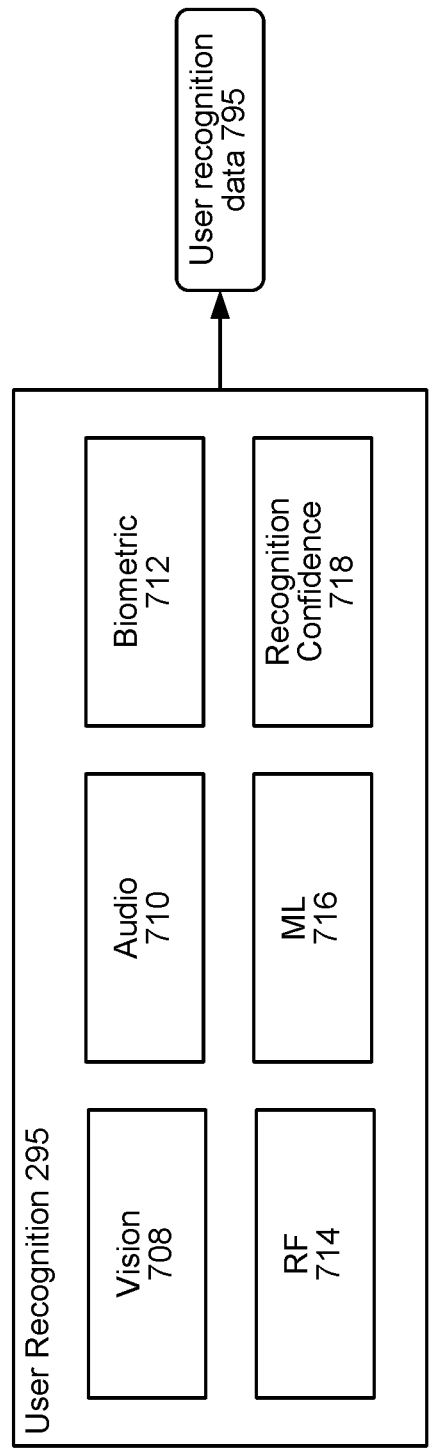
FIG. 7 is a conceptual diagram illustrating example types of user recognition processing that can be performed by a user recognition component, according to embodiments of the present disclosure.
Figure 8:
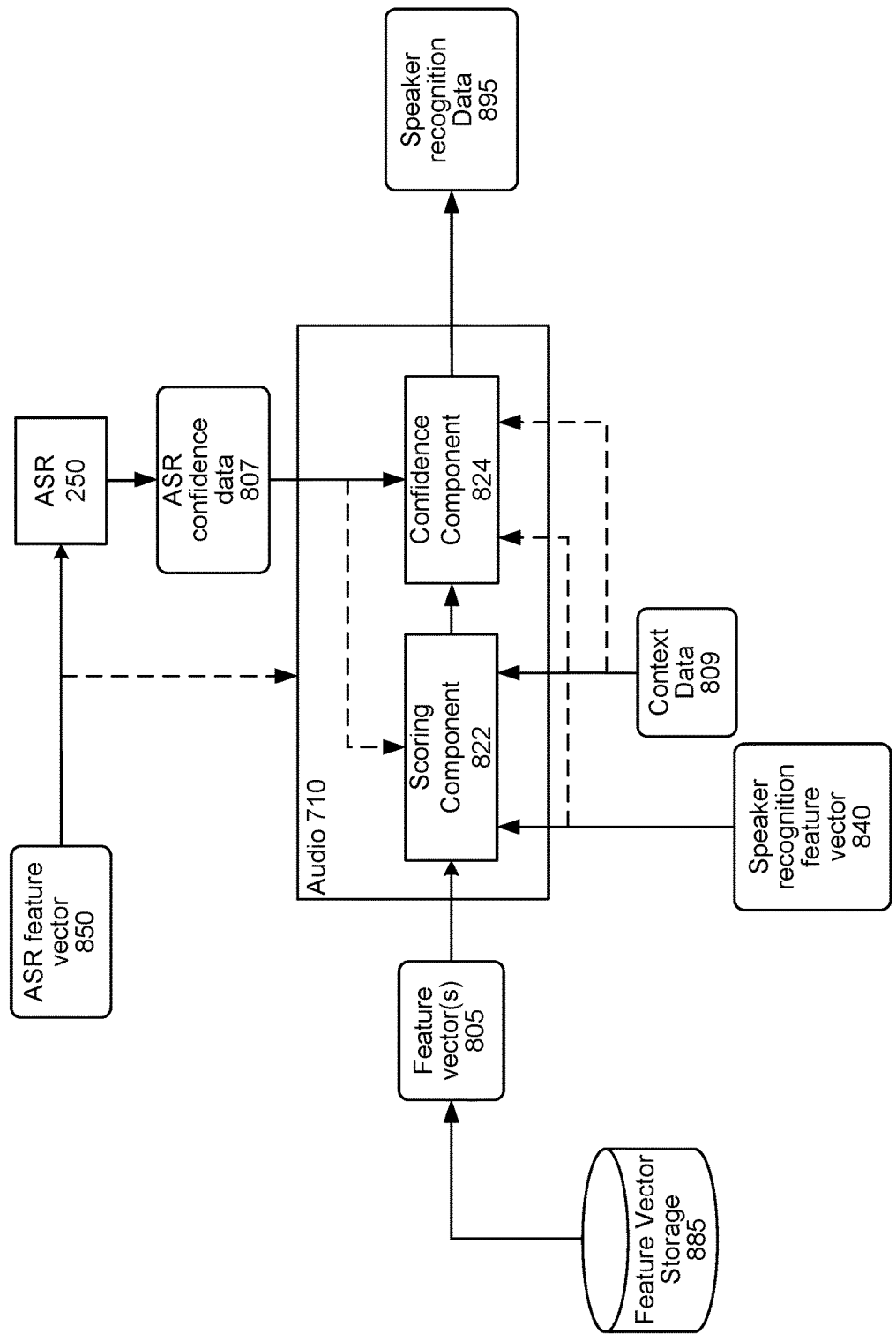
FIG. 8 is a conceptual diagram illustrating speaker recognition processing, according to embodiments of the present disclosure.

The system 120 may include a user recognition component 295 (as illustrated in FIGS. 2 and 7-8). In at least some examples, the user recognition component 295 may be implemented as a skill.

As illustrated in FIG. 7, the user recognition component 295 may include a vision component 708, an audio component 710, a biometric component 712, a radio frequency (RF) component 714, a machine learning (ML) component 716, and/or a recognition confidence component 718. In at least some instances, the user recognition component 295 may monitor data and determinations from various components to recognize an identity of one or more users associated with data input to the system 120. The user recognition component 295 may output user recognition data 795, which may include a user identifier associated with a user the user recognition component 295 believes originated data input to the system 120. The user recognition component 295 may be used to inform processes performed by various components of the system 120.

The vision component 708 may receive data from one or more sensors capable of providing images (e.g., cameras) or sensors indicating motion (e.g., motion sensors). The vision component 708 can perform facial recognition or image analysis to determine an identity of a user. In at least some instances, when a user is facing a camera, the vision component 708 may perform facial recognition and identify the user with a high degree of confidence. In at least some other instances, the vision component 708 may have a low degree of confidence of an identity of a user, and the user recognition component 295 may use determinations from additional components to determine an identity of a user. The vision component 708 can be used in conjunction with other components to determine an identity of a user. For example, the user recognition component 295 may use data from the vision component 708 with data from the audio component 710 to identify what user's face appears to be speaking at the same time audio is captured by a device 110 the user is facing for purposes of identifying a user who spoke an input to the system 120.

The system 100 of the present disclosure may include biometric sensors that transmit data to the biometric component 712. For example, the biometric component 712 may receive data corresponding to fingerprints, iris or retina scans, thermal scans, weights of users, a size of a user, pressure (e.g., within floor sensors), etc., and may determine a biometric profile corresponding to a user. Output of the biometric component 712 may be used to distinguish between a user and sound from a television, for example. Thus, output of the biometric component 712 may be used to adjust one or more confidences for determining an identity of a user. Biometric information, output by the biometric component 712, can be associated with specific user profile data such that the biometric information uniquely identifies a user profile of a user.

The RF component 714 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 714 the strength of the signal (e.g., as a received signal strength indication (RSSI)). The RF component 714 may use the RSSI to determine an identity of a user (with an associated confidence level). In some instances, the RF component 714 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the system 120 for purposes of the system 120 determining who spoke a particular input. Such a registration may occur prior to, during, or after speaking of an input.

The ML component 716 may track the behavior of various users as a factor in determining a user corresponding to a particular input. By way of example, a user may adhere to a regular schedule such that the user is at a first location during the day (e.g., at work or at school). In this example, the ML component 716 would factor in past behavior and/or trends in determining the identity of the user that provided input to the system 120. Thus, the ML component 716 may use historical data and/or usage patterns over time to increase or decrease a confidence level of an identity of a user.

In at least some instances, the recognition confidence component 718 may receive data output by two or more of the vision component 708, the audio component 710, the biometric component 712, the RF component 714, and the ML component 716, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 795.

The audio component 710 may receive data from one or more sensors capable of providing an audio signal (e.g., one or more microphones). The audio component 710 may perform audio recognition on an audio signal to determine an identity of the user and associated user identifier. In at least some instances, the audio component 710 may perform speaker recognition processing on all sound in an environment. In at least some instances, the audio component 710 may perform speaker recognition processing on audio data 211 input into the system 120 for speech processing. The audio component 710 may determine scores indicating whether speech in the audio data 211 originated from particular users. For example, a first score may indicate a likelihood that speech originated from a first user associated with a first user identifier, a second score may indicate a likelihood that speech originated from a second user associated with a second user identifier, etc. The audio component 710 may perform speaker recognition processing by comparing speech characteristics (represented in received audio data) to stored speech characteristics of users (e.g., stored voice profiles associated with the device 110 that captured the speech).

FIG. 8 illustrates speaker recognition processing as it may be performed by the audio component 710. The audio component 710 may receive ASR confidence data 807 output from the ASR component 250.

The audio component 710 performs speaker recognition processing using various data, including a speaker recognition feature vector 840 (representing a present speech), one or more stored feature vectors 805 (representing stored voice profiles), the ASR confidence data 807, and context data 809. The audio component 710 may output speaker recognition data 895 that reflects a certain confidence that the speech was spoken by one or more particular users. The audio component 710 may include one or more user identifiers (e.g., each corresponding to a different user's stored feature vector). Each user identifier, in the audio component 710, may be associated with a respective confidence value representing a likelihood that the speech corresponds to the user identifier's associated voice profile. A confidence value may be a numeric or binned value.

The feature vector(s) 805, input to the audio component 710, may correspond to one or more feature vectors associated with a device identifier corresponding to the device 110 that received the speech presently being processed. The audio component 710 may use the feature vector(s) 805 to compare against the speaker recognition feature vector 840, representing the present speech, to determine whether the speaker recognition feature vector 840 corresponds to one or more of the feature vectors 805.

Each feature vector 805 may be the same size as the speaker recognition feature vector 840. For example, if the speaker recognition feature vector 804 is encoded of size F, a feature vector 805 may also be encoded to size F.

To perform speaker recognition processing, the audio component 710 may determine the device 110 from which the audio data 211 originated. For example, the audio data 211 may be associated with metadata including a device identifier representing the device 110. Either the device 110 or the system 120 may generate the metadata. The system 120 may determine a group profile identifier associated with the device identifier, may determine user identifiers associated with the group profile identifier, and may include the group profile identifier and/or the user identifiers in the metadata. The remote system 120 may associate the metadata with the speaker recognition feature vector 840 produced from the audio data 211. In at least some embodiments, the metadata may be sent to the audio component 710 as context data 809.

The audio component 710 may query a feature vector storage 885 for feature vectors 805 associated with the device identifier, the group profile identifier, and/or the user identifiers represented in the metadata (e.g., represented in the context data 809). This limits the universe of possible feature vectors 805 the audio component 710 considers at runtime and thus decreases the amount of time to perform speaker recognition processing by decreasing the amount of feature vectors 805 needed to be processed. Alternatively, the audio component 710 may access all (or some other subset of) the feature vectors 805 available to the audio component 710 (e.g., stored in the feature vector storage 885). However, accessing all feature vectors 805 will likely increase the amount of time needed to perform speaker recognition processing based on the magnitude of feature vectors 805 to be processed.

The audio component 710 may attempt to identify the user that spoke the speech represented in the audio data 211 by comparing the speaker recognition feature vector 840 to the feature vector(s) 805. The audio component 710 may include a scoring component 822 that determines respective scores indicating whether the speech (represented by the speaker recognition feature vector 840) was spoken by one or more particular users (represented by the feature vector(s) 805). The audio component 710 may also include a confidence component 824 that determines an overall accuracy of speaker recognition processes (such as those of the scoring component 822) and/or an individual confidence value with respect to each user potentially identified by the scoring component 822. The output from the scoring component 822 may include a different confidence value for each received feature vector 805. Although illustrated as two separate components, the scoring component 822 and the confidence component 824 may be combined into a single component, or may be separated into more than two components.

The scoring component 822 and the confidence component 824 may implement one or more trained machine learning models (such neural networks, classifiers, etc.) as known in the art. For example, the scoring component 822 may use probabilistic linear discriminant analysis (PLDA) techniques. PLDA scoring determines how likely it is that the speaker recognition feature vector 840 corresponds to a particular feature vector 805. The PLDA scoring may generate a confidence value for each feature vector 805 considered and may output a list of confidence values associated with respective user identifiers. The scoring component 822 may additionally or alternatively use other techniques, such as GMMs, generative Bayesian models, or the like, to determine confidence values.

The confidence component 824 may receive various data including the ASR confidence data 807, speech length (e.g., number of frames or other measured length of the speech), audio condition/quality data (such as signal-to-interference data or other metric data), fingerprint data, image data, or other factors to consider how confident the audio component 710 is with regard to the confidence values linking users to the speech. The confidence component 824 may also consider the confidence values and associated identifiers output by the scoring component 822. For example, the confidence component 824 may determine that a lower ASR confidence (represented in the ASR confidence data 807), or poor audio quality, or other factors, may result in a lower confidence of the audio component 710. Whereas a higher ASR confidence (represented in the ASR confidence data 807), or better audio quality, or other factors, may result in a higher confidence of the audio component 710. Precise determination of the confidence may depend on configuration and training of the confidence component 824 and the model(s) implemented thereby. The confidence component 824 may operate using a number of different machine learning models/techniques such as GMM, neural networks, etc. For example, the confidence component 824 may be a classifier configured to map a score output by the scoring component 822 to a confidence value.

The audio component 710 may output speaker recognition data 895 specific to one or more user identifiers. For example, the audio component 710 may include each user identifier associated with a feature vector 805 input to the audio component 710. The speaker recognition data 895 may include numeric confidence values (e.g., 0.0-1.0, 0-1000, or whatever scale the system is configured to operate). Thus the speaker recognition data 895 may include an N-best list of user identifiers associated with respective numeric confidence values (e.g., user identifier 123—0.2, user identifier 234—0.8). Additionally or alternatively, the speaker recognition data 895 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus the speaker recognition data 895 may include an N-best list of user identifiers associated with respective binned confidence values (e.g., user identifier 123—low, user identifier 234—high). Combined binned and numeric confidence value outputs are also possible. Rather than a list of user identifiers and their respective confidence values, the speaker recognition data 895 may only include information related to the top scoring user identifier. The audio component 710 may also output an overall confidence value that the individual confidence value(s) is correct, where the overall confidence value indicates how confident the audio component 710 is in the speaker recognition data 895.

The confidence component 824 may consider differences between individual confidence values when determining the speaker recognition data 895. For example, if a difference between a first confidence value and a second confidence value is large, and the first confidence value is above a threshold confidence value, then the audio component 710 is able to recognize a first user (associated with the feature vector 805 associated with the first confidence value) as the user that spoke the speech with a much higher confidence than if the difference between the confidence values were smaller.

The audio component 710 may perform thresholding to avoid incorrect speaker recognition data 895 being output. For example, the audio component 710 may compare a confidence value, output by the confidence component 824, to a threshold confidence value. If the confidence value does not satisfy (e.g., does not meet or exceed) the threshold confidence value, the audio component 710 may not output speaker recognition data 895, or may only include in that data 895 an indicator that a user could not be recognized.

The audio component 710 may be defaulted to output binned (e.g., low, medium, high) speaker recognition confidence values. However, such may be problematic in certain situations. For example, if the audio component 710 computes a single binned confidence value for multiple feature vectors 805, the audio component 710 may not be able to effectively determine which user originated the speech. In this situation, the audio component 710 may be configured to override its default setting and output numeric confidence values. This enables the audio component 710 to determine a user, associated with the highest numeric confidence value, originated the speech.

The audio component 710 may consider context data 809 to inform speaker recognition processing. A trained model(s) or other component of the audio component 710 may be trained to take context data 809 as an input feature when performing speaker recognition processing. The context data 809 may include a variety of data types depending on system configuration and may be made available from other sensors, devices, or storage. The context data 809 may include a time of day when the audio data 211 was generated by or received from the device 110, a day of a week when the audio data audio data 211 was generated by or received from the device 110, etc.

The context data 809 may include data output by the vision component 708. For example, the vision component 708 may perform facial recognition processing on image or video data received from the device 110 from which the audio data 211 was received (or another device). The output of the vision component 708 may be used by the audio component 710. That is, facial recognition output data may be used in conjunction with the comparison of the speaker recognition feature vector 840 and one or more feature vectors 805 to perform more accurate speaker recognition processing.

The context data 809 may include location data representing a location (e.g., a geographic location, a particular location within a building, etc.) of the device 110. The location data may represent a geographic location (e.g., country, state, town, etc.) where the device 110 is located. The location data may additionally or alternatively represent a specific location within a building. For example, if the device 110 is located in user A's bedroom, such location may increase a speaker recognition confidence value associated with user A and/or decrease a speaker recognition confidence value associated with user B.

The context data 809 may indicate a type of the device 110. Different types of devices may include, for example, a smart watch, a smart phone, a tablet computer, and a vehicle. The type of the device 110 may be indicated in a profile associated with the device 110. For example, if the device 110, from which the audio data 211 was received, is a smart watch or vehicle belonging to a user A, the fact that the device 110 belongs to user A may increase a speaker recognition confidence value associated with user A and/or decrease a speaker recognition confidence value associated with user B.

The context data 809 may include global positioning system (GPS) information associated with the device 110. For example, a group profile associated with a vehicle may indicate multiple users (e.g., user A and user B). The vehicle may include a GPS indicating latitude and longitude coordinates of the vehicle when the audio data 211 is generated by the vehicle. As such, if the vehicle is located at a coordinate corresponding to a location (e.g., work, home, school, etc.) associated with user A, such may increase a speaker recognition confidence value associated with user A and/or decrease speaker recognition confidence values of all other users indicated in a group profile associated with the vehicle. Global coordinates and associated locations (e.g., work, home, etc.) may be indicated in a profile associated with the device 110. The global coordinates and associated locations may also or alternatively be associated with one or more user profiles.

The context data 809 may indicate activity of a particular user that may be useful in performing speaker recognition processing. For example, if a user has recently entered a code to disable a home security alarm, and the audio data 211 was received from a device 110 represented in a group profile associated with the home, signals from the home security alarm about the disabling user, time of disabling, etc. may be reflected in the context data 809 and considered by the audio component 710. If a mobile device (such as a smart phone, Tile, dongle, or other device) known to be associated with a particular user is detected proximate to (for example physically close to, connected to the same WiFi network as, or otherwise nearby) the device 110, this may be reflected in the context data 809 and considered by the audio component 710.

Various machine learning techniques may be used to train and operate models to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Referring again to FIG. 2, the system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to natural language inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 125 that the user has enabled. When a user enables a skill component 125, the user is providing the system 120 with permission to allow the skill component 125 to execute with respect to the user's natural language inputs. If a user does not enable a skill component 125, the system 120 may not invoke the skill component 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data. A device profile may also include one or more user identifiers, corresponding to one or more user profiles associated with the device profile. For example, a household device's profile may include the user identifiers of users of the household.

Figure 9:
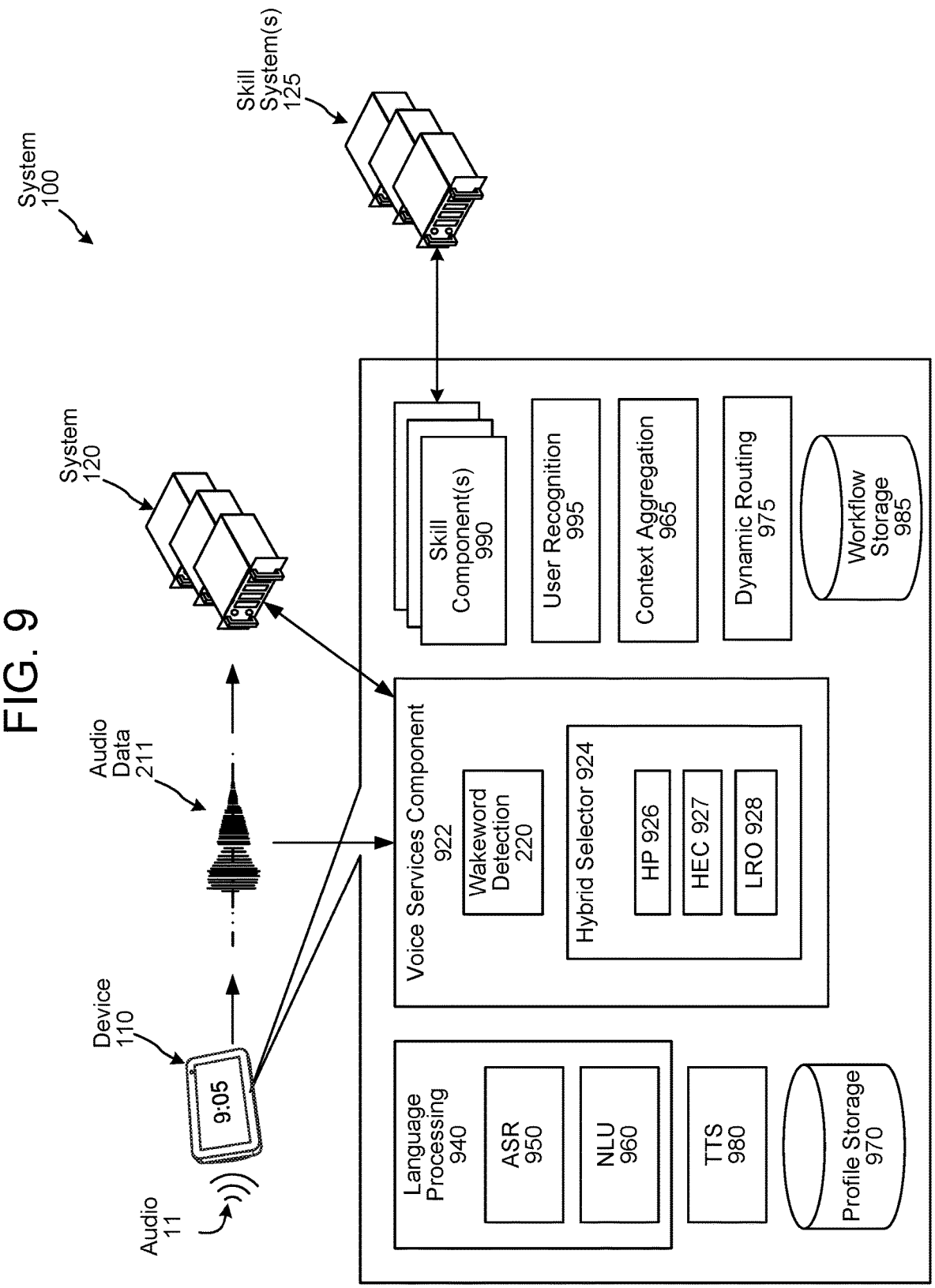
FIG. 9 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing of the system 120 described above. FIG. 9 illustrates how a device 110 may be configured to perform speech processing as well as other processing described above with respect to the system 120. Optimizing utilization of on-device computing resources (e.g., processing resources, etc.) of the device 110, in at least some situations, can reduce latency so that the user experience with the device 110 is not negatively impacted by local processing tasks taking too long.

The device 110 may include a language processing component 940. While FIG. 9 illustrates the language processing component 940 as including an ASR component 950 and/or an NLU component 960, the disclosure is not limited thereto. For example, the language processing component 940 may include a SLU component without departing from the disclosure. For example, the SLU component may be configured to receive audio data as an input and generate NLU data as an output, similar to the combination of the ASR component 950 and the NLU component 960.

In at least some embodiments, the system 120 may be configured to receive the audio data 211 from the device 110, to recognize speech corresponding to a spoken input in the received audio data 211 using a language processing component 240 (which may be referred to as a remote speech processing system), and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 980) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component XA20 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 924, of the device 110, may send the audio data 211 to the wakeword detection component 220. If the wakeword detection component 220 detects a wakeword in the audio data 211, the wakeword detection component 220 may send an indication of such detection to the hybrid selector 924. In response to receiving the indication, the hybrid selector 924 may send the audio data 211 to the system 120 and/or the local language processing component 940 (in which case the system 120 and the local language processing component 940 may process the audio data 211 in parallel, or at least partially in parallel, although the disclosure is not limited thereto). The wakeword detection component 220 may also send an indication, to the hybrid selector 924, representing a wakeword was not detected. In response to receiving such an indication, the hybrid selector 924 may refrain from sending the audio data 211 to the system 120, and may prevent the local language processing component 940 from further processing the audio data 211. In this situation, the audio data 211 can be discarded.

The device 110 may conduct its own speech processing using on-device language processing components, such as an ASR component 950 and an NLU 960, similar to the manner discussed above with respect to the ASR component 250 and the NLU component 960 of the system 120. The device 110 may also internally include, or otherwise have access to, other components such as one or more skill components 990 capable of executing commands based on NLU output data or other results determined by the device 110, a speaker recognition component 995 (configured to process in a similar manner to that discussed above with respect to the speaker recognition component 295 of the system 120), profile storage 970 (configured to store similar profile data to that discussed above with respect to the profile storage 270 of the system 120), or other components. In at least some embodiments, the profile storage 970 may only store profile data for a user or group of users specifically associated with the device 110. Similar to as described above with respect to FIG. 2, a skill component 990 may communicate with a skill system(s) 125.

In at least some embodiments, the on-device language processing components may not have the same capabilities as the language processing components of the system 120. For example, the on-device language processing components may be configured to handle only a subset of the spoken inputs that may be handled by the system 120. For example, such subset of spoken inputs may corresponding to local-type spoken inputs, such as those controlling devices or components associated with a user's home. In such circumstances the on-device language processing components may be able to more quickly interpret and respond to a local-type spoken input, for example, than processing that involves the system 120. If the device 110 attempts to process a spoken input for which the on-device language processing components are not necessarily best suited, the language processing results generated by the device 110 may indicate a low confidence or other metric indicating that the processing by the device 110 may not be as accurate as the processing done by the system 120.

The hybrid selector 924, of the device 110, may include a hybrid proxy (HP) 926. The HP 926 can be implemented as a layer within a voice services component 922 and may be configured to proxy traffic to/from the system 120. For example, the HP 926 may be configured to send messages to/from a hybrid execution controller (HEC) 927 of the hybrid selector 924. For example, command/directive data received from the system 120 can be sent to the HEC 927 using the HP 926. The HP 926 may also be configured to allow the audio data 211 to pass to the system 120 while also receiving (e.g., intercepting) this audio data 211 and sending the audio data 211 to the HEC 927.

In at least some embodiments, the hybrid selector 924 may further include a local request orchestrator (LRO) 928 configured to notify the local language processing component 940 about the availability of new audio data 211 that represents user speech, and to otherwise initiate the operations of the local language processing component 940 when new audio data 211 becomes available. In general, the hybrid selector 924 may control execution of the local language processing component 940, such as by sending "execute" and "terminate" events/instructions to the local language processing component 940. An "execute" event may instruct the local language processing component 940 to continue any suspended execution based on the audio data 211 (e.g., by instructing the local language processing component 940 to execute on a previously-determined intent in order to generate a directive). Meanwhile, a "terminate" event may instruct the local language processing component 940 to terminate further execution based on the audio data 211, such as when the device 110 receives directive data from the system 120 and chooses to use that remotely-generated directive data.

Thus, when the audio data 211 is received by the voice services component 922, the HP 926 may allow the audio data 211 to pass through to the system 120 and the HP 926 may also input the audio data 211 to the on-device language processing component 941 by routing the audio data 211 through the HEC 927 of the hybrid selector 924, whereby the LRO 928 notifies the local language processing component 941 of the incoming audio data 211. At this point, the hybrid selector 924 may wait for response data from either or both of the system 120 or the local language processing component 940. However, the disclosure is not limited thereto, and in some examples the hybrid selector 924 may send the audio data 211 only to the local language processing component 941 without departing from the disclosure. For example, the device 110 may process the audio data 211 locally without sending the audio data 211 to the system 120.

The local language processing component 240 is configured to receive the audio data 211 from the hybrid selector 924, to recognize speech in the audio data 211, to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 940 (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

The language processing component 940 may process the audio data 211 to determine local NLU output data, which may include intent data and/or slot data, so that directives may be determined based on the intent data and/or the slot data. Thus, the language processing component 940 may process the audio data 211 and attempt to make a semantic interpretation of the spoken input represented by the audio data 211 (e.g., determine a meaning associated with the spoken input) and then implement that meaning. For example, the language processing component 940 may interpret the spoken input, in the audio data 211, in order to derive an intent or a desired action or operation from the user 5. This may include deriving pertinent pieces of information from the spoken input that allow the language processing component 940 to identify a second device in the environment, if the user, for example, intends to control a second device (e.g., a light in the user 5's house). The local language processing component 940 may also provide a dialog management function to engage in speech dialogue with the user 5 to determine (e.g., clarify) intents by asking the user 5 for information using synthesized speech prompts.

In at least some embodiments, the language processing component 940 may output a single NLU hypothesis determined to most likely representing the spoken input in the audio data 211. Alternatively, in at least some embodiments, the language processing component 940 may output multiple NLU hypotheses in the form of a lattice or an N-best list, with individual NLU hypotheses corresponding to respective confidence values or other values (such as probability values, etc.). In at least some embodiments, the language processing component 940 may be customized to the user 5 (or multiple users) who created a user account to which the device 110 is registered. For example, the language processing component 940 may process the audio data 211 based on known information (e.g., preferences) of the user 5, and/or on a history of previous interactions with the user 5.

NLU output data, as determined by the device 110 and/or the system 120, may include confidence data representing a confidence and/or estimated accuracy of the NLU output data. Such confidence data may come in the form of a numeric score, but may also come in different forms such as an indicator of Low, Medium, or High, a ranking, or other data. The confidence data may be set to a similar scale so that confidence data for one set of NLU output data (e.g., NLU output data generated by the device 110) may be evaluated with regard to confidence data for another set of results (e.g., NLU output data generated by the system 120).

Thus, an NLU hypothesis may be selected as usable to respond to the spoken input, and the local language processing component 940 may send local response data (e.g., local NLU output data and/or local directive data) to the hybrid selector 924, such as a "ReadyToExecute" response, which can indicate that the local language processing component 940 has recognized an intent, or is ready to communicate failure (e.g., if the local language processing component 940 could not recognize an intent). The hybrid selector 924 may then determine whether to use directive data from the local language processing component 940 to respond to the spoken input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each spoken input. The device 110 may include the unique identifier when sending the audio data 211 to the system 120, and the response data from the system 120 may include the unique identifier to identify which spoken input the response data corresponds.

In at least some embodiments, the device 110 may include, or be configured to use, one or more skill components 990 that may work similarly to the skill component(s) 290 implemented by the system 120. The skill component(s) 990 may correspond to one or more domains that are used in order to determine how to act on a spoken input in a particular way, such as by outputting a directive that corresponds to the determined intent, and which can be processed to implement the desired operation. Accordingly, the term "skill" may be used interchangeably with the terms "speechlet," "domain," or "domain implementation." The skill component(s) 990 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 990, a skill system 125, of a combination of a skill component 990 and a corresponding skill system 125.

In order to generate a particular interpreted response, the language processing component 940 may apply grammar models and lexical information associated with the respective skill to recognize one or more entities in the spoken input. In this manner the language processing component 940 may identify "slots" (i.e., particular words in the spoken input) that may be needed for later command processing. Depending on the complexity of the language processing component 940, it may also label each slot with a type of varying levels of specificity (such as noun, place, city, artist name, song name, device name, or the like). Each grammar model used by the language processing component 940 may include the names of entities (i.e., nouns) commonly found in speech about the particular skill (i.e., generic terms), whereas the lexical information (e.g., from a gazetteer) is personalized to the user 5 and/or the device 110. For example, a grammar model associated with a navigation skill may include a database of words commonly used when people discuss navigation.

Accordingly, the intents identified by the language processing component 940 may be linked to skill-specific grammar frameworks with "slots" or "fields" to be filled (e.g., resolved). Each slot/field corresponds to a portion of the spoken input that the language processing component 940 believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the language processing component 940 may parse the spoken input to identify words as subject, object, verb, preposition, etc., based on grammar rules and/or models, prior to recognizing named entities. The identified verb may be used by the language processing component 940 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The language processing component 940 may then search the corresponding fields in the skill-specific and personalized lexicon(s), attempting to match words and phrases in the spoken input tagged as a grammatical object or object modifier with those identified in the database(s).

Figure 10:
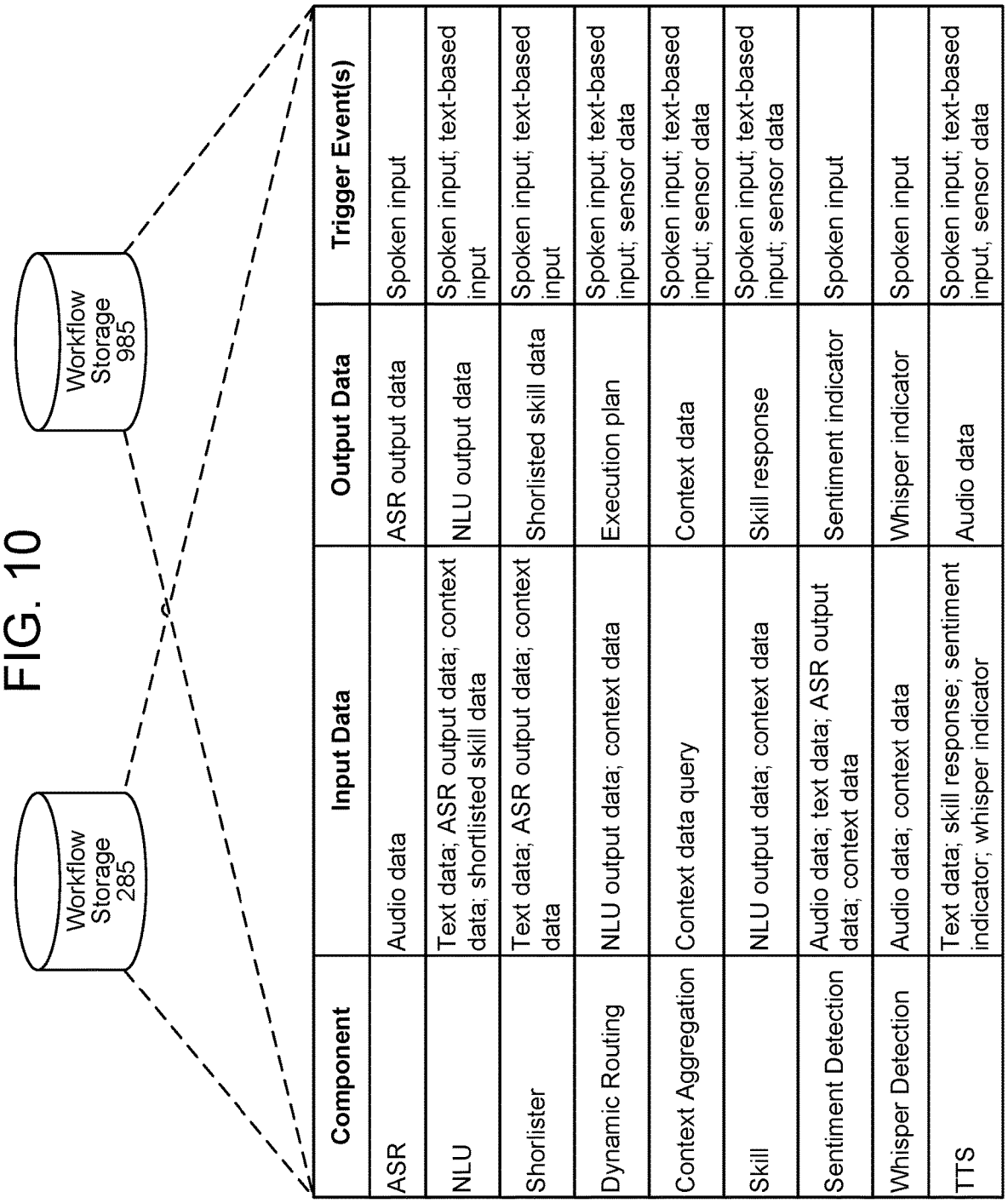
FIG. 10 is a conceptual diagram illustrating data that may be stored in a workflow storage(s), according to embodiments of the present disclosure.

The orchestrator component 230 (of the system 120) may include or otherwise have access to a workflow storage 285. Likewise, the LRO 928 (of the device 110) may include or otherwise have access to a workflow storage 985. As illustrated in FIG. 10, the workflow storage 285/985 may store data representing various components of the system 120 and/or the device 110. More specifically, the workflow storage 285 may store data representing various components of the system 120, whereas the workflow storage 985 may store data representing various components of the device 110. Each component, represented in the workflow storage 285/985, may be associated with data representing one or more types of data that may be input to the component, one or more types of data that may be output from the component, and one or more trigger events with respect to which the component may be called to process.

It is to be noted that the workflow storage 285/985 does not include data indicating where data, input to a component, is to be output from. Likewise, the workflow storage 285/985 does not include data indicating where data, output from a component, is to be sent to. Such enables new components to be incorporated into a workflow without having to reconfigure the workflow to indicate where data is to be received from and where data is to be sent to. As described below, the orchestrator component 230 and the LRO 928 may be configured to make such determinations at runtime.

It is also noted that the data in the workflow storage 285/985 may represent components in a decoupled manner, as compared to a linearly-coded workflow. For example, as illustrated in FIG. 4, the shortlister 410 may be configured as part of the NLU component 260. However, in FIG. 10, the shortlister 410 is represented as being a separate component from the NLU component 260. A benefit of such decoupling is that, whereas updating processing performable by the shortlister 410 (as implemented in FIG. 4) may require updating of the NLU component 260, updating processing performable by the shortlister 410 (decoupled from the NLU component 260 as illustrated in FIG. 10) may not require updating of the NLU component 260 (provided that the data type(s) output by the shortlister 410 before and after such updating remains the same).

It is further noted that different components, represented in the workflow storage 285/985 may correspond to different trigger events. In at least some embodiments, the system 120 may be configured with various orchestrator components (and the device 110 may be configured with different LROs), with each orchestrator component/LRO being associated with a different trigger event. For example, a first orchestrator component/LRO may be configured to generate and orchestrate DAGs in response to spoken natural language inputs, a second orchestrator component/LRO may be configured to generate and orchestrate DAGs in response to text-based natural language inputs, a third orchestrator component/LRO may be configured to generate and orchestrate DAGS in response to a specific type of sensor data, etc.

At runtime, the system 120/device 110 may receive an input corresponding to a trigger event, determine an endpoint of processing to be achieved with respect to the trigger event, and may work backward (starting with the endpoint component) through data dependencies until the system 120/device 110 has constructed a directed acyclic graph (DAG, a graph comprising nodes connected by unidirectional edges) representative of a processing workflow specific to the received trigger event. More specifically, the endpoint of processing, as determined by the orchestrator component 230/LRO 928 of the system 120/device 110, may correspond to a processing component represented in the workflow storage 285/985 as corresponding to the present trigger event and indicated as needing to receive one or more types of context data.

Figure 11A:
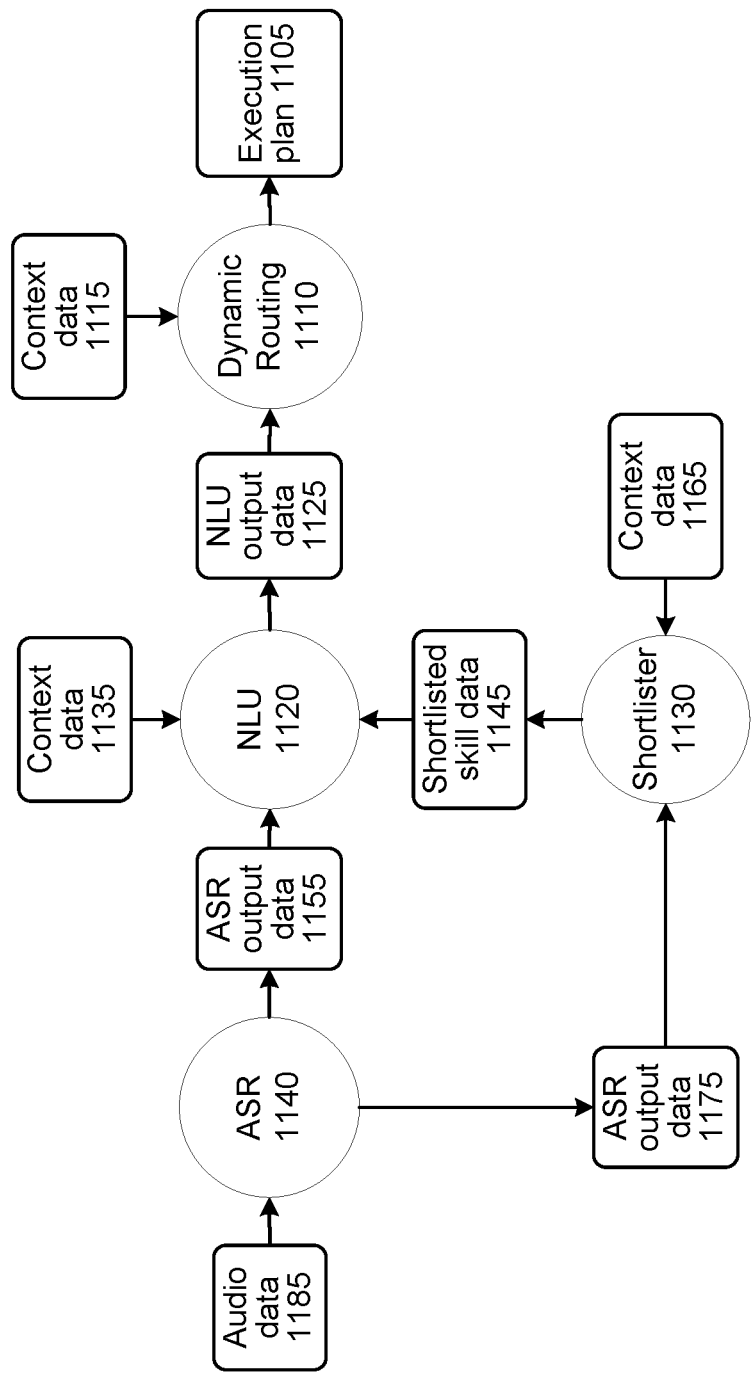
FIG. 11A is a conceptual diagram illustrating a directed acyclic graph (DAG) that may be generated in response to receiving a spoken natural language input, according to embodiments of the present disclosure.

Using FIG. 11A as an example, the orchestrator component 230/LRO 928 may determine, in response to receiving (or determining) audio data 211 representing a spoken natural language input, that the dynamic routing component 275/975 will need to be called to process with respect to the spoken natural language input. The orchestrator component 230/LRO 928 may then query the workflow storage 285/985 for one or more data types needed by the dynamic routing component 275/975 to generate an execution plan 635. In response, the orchestrator component 230/LRO 928 may receive data representing NLU output data and one or more types of context data. The orchestrator component 230/LRO 928 may then construct a portion of a DAG that includes a node 1110 representing the dynamic routing component 275/975, an edge 1105 representing the dynamic routing component 275/975 outputs execution plan data, an edge 1115 representing the dynamic routing component 275/975 receives the one or more types of context data, and an edge 1125 representing the dynamic routing component receives NLU output data.

After constructing the aforementioned DAG portion for the dynamic routing component 275/975, the orchestrator component 230/LRO 928 may query the workflow storage 285/985 for one or more components that output NLU output data. In response, the orchestrator component 230/LRO 928 may receive an indication of the NLU component 260/960, and the data type(s) the NLU component 260/960 needs to receive in order to generate the NLU output data. The orchestrator component 230/LRO 928 may thereafter generate a portion of the DAG that includes a node 1120 representing the NLU component 260/960 (which is connected to the edge 1125 corresponding to NLU output data input to the dynamic routing component 275/975), an edge 1135 representing the NLU component 260/960 receives the one or more types of context data described herein above with respect to FIG. 4, an edge 1145 representing the NLU component 260/960 receives a list representing a subset of skills with respect to which the NLU component 260/960 is to process, and an edge 1155 representing the NLU component 260/960 receives ASR output data.

After constructing the aforementioned DAG portion for the NLU component 260/960, the orchestrator component 230/LRO 928 may query the workflow storage 285/985 for one or more components that output a list representing a subset of skills with respect to which the NLU component 260/960 is to process. In response, the orchestrator component 230/LRO 928 may receive an indication of the shortlister 410, and one or more data types the shortlister 410 needs to receive in order to generate the list of skills. The orchestrator component 230/LRO 928 may thereafter generate a portion of the DAG that includes a node 1130 representing the shortlister 410 (which is connected to the edge 1145 corresponding to shortlisted skill data input to the NLU component 260/960), an edge 1165 representing the shortlister 410 receives the one or more types of context data described herein above with respect to FIG. 4, and an edge 1175 representing the shortlister 410 receives ASR output data.

After constructing the aforementioned DAG portion for the NLU component 260/960, and before or after constructing the aforementioned DAG portion for the shortlister 1130, the orchestrator component 230/LRO 928 may query the workflow storage 285/985 for one or more components that output ASR output data. In response, the orchestrator component 230/LRO 928 may receive an indication of the ASR component 250/950, and one or more data types the ASR component 250/950 needs to receive in order to generate the ASR output data. The orchestrator component 230/LRO 928 may thereafter generate a portion of the DAG that includes a node 1140 representing the ASR component 250/950 (which is connected to the edge 1155 corresponding to ASR output data input to the NLU component 260/960, and the edge 1175 corresponding to ASR output data input to the shortlister 410), and an edge 1185 representing the ASR component 250/950 receives audio data representing a spoken natural language input.

As indicated above, the orchestrator component 230/LRO 928 queries the workflow storage 285/985 for data representing a component(s) capable of outputting a particular data type (corresponding to an input data edge of a previously-generated portion of the DAG). And in response the orchestrator component 230/LRO 928 receives data indicating a component(s) and one or more data types needed by the component(s) to generate the particular data type. In at least some instances, an indicated component may be capable of generating various data types. By constructing the system such that the orchestrator component 230/LRO 928 only receives an indication of the data type needed by the component to generate the particular data type (rather than receiving an indication of all data capable of being input to the component), the system may limit the runtime processing of the component to only processes relevant to processing of the particular natural language input by a downstream component. Such may reduce user-perceived latency.

The foregoing description of FIG. 11A describes an illustrative DAG that may be generated by a system 120/device 110 in response to receiving a spoken natural language input. It will be appreciated that different systems/devices may implement different components. Accordingly, it will be appreciated that the backwards-oriented DAG generation technique described with respect to FIG. 11A may be applied by various systems/devices, but that the runtime-generated DAG of one system/device may be different from the runtime-generated DAG of another system/device.

It is noted that since the data in components in the workflow storage 285/986 are not all associated with the same trigger event, that the orchestrator component 230/LRO 928 may generate different DAGs at runtime depending on the received trigger event. Thus, the orchestrator component 230/LRO 928 may be considered to dynamically generate DAGs at runtime.

In at least some embodiments, the orchestrator component 230/LRO 928 may store a DAG as two tables of data. For example, one table may represent nodes of the DAG, and the other table may represent edges of the DAG. Each entry in the node table may include, for example, a node identifier, identifiers are edges that come off the node, and data describing a value of the node (e.g., a component identifier). Each entry in the edge table may include, for example, an edge identifier, a node identifier corresponding to a node to which the edge points, and data describing a function of the edge.

Figure 11B:
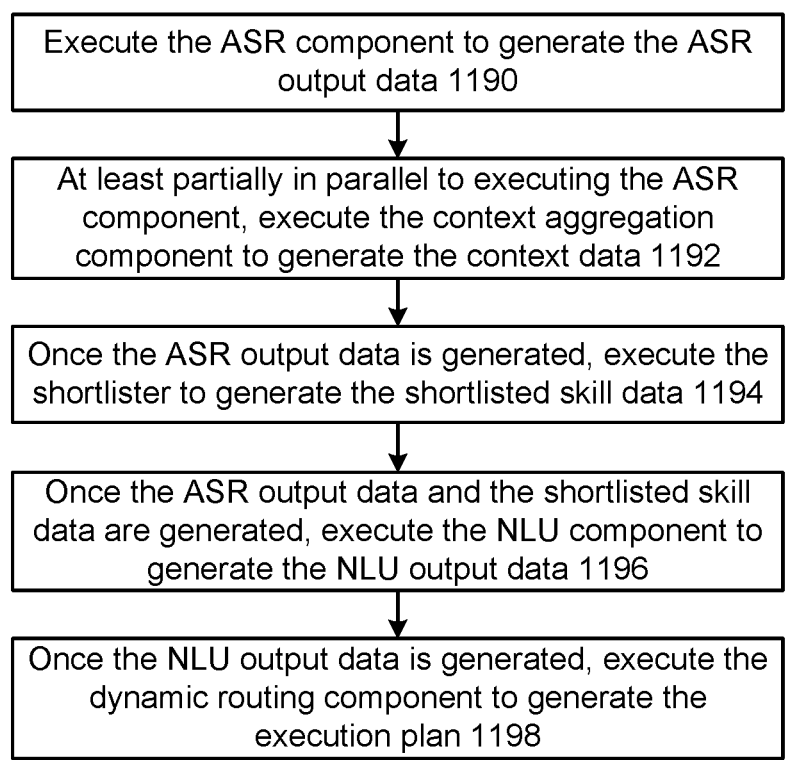
FIG. 11B is process flow diagram illustrating how components, represented in the DAG of FIG. 11A, can be executed at least partially in parallel, according to embodiments of the present disclosure.

The orchestrator component 230/LRO 928 may be configured to frontload processing in the DAG that is not dependent on processing of another component. As illustrated in FIG. 11B (and with reference to the DAG of FIG. 11A), the orchestrator component 230/LRO 928 may commence processing the spoken natural language input (represented in the audio data 1185) by executing (1190) the ASR component 250/950 to generate the ASR output data 1155.

At least partially in parallel to executing the ASR component 250/950, the orchestrator component 230/LRO 928 may execute (1192) the context aggregation component 265/965 to generate the context data 1115, 1135, and 1165 needed by downstream components of the system 120/device 110 to process the spoken natural language input. In at least some embodiments, the orchestrator component 230/LRO 928 may send, to the context aggregation component 265/965, a single context data query 505 associated with a natural language input identifier (corresponding to the present spoken natural language input) and representing all of the context data types needed by NLU component 260/960, the shortlister 410, and the dynamic routing component 275/975. Alternatively, in at least some embodiments, the orchestrator component 230/LRO 928 may send multiple context data queries to the context aggregation component 265/965, with each context data query representing a context data type(s) needed by a different component represented in the DAG. Using the DAG of FIG. 11A as an example, the orchestrator component 230/LRO 928 may send, to the context aggregation component 265/965, a first context data query 505*a* associated with the natural language input identifier and representing the context data type(s) needed by the NLU component 260/960, a second context data query 505*b* associated with the natural language input identifier and representing the context data type(s) needed by the shortlister 410, and a third context data query associated with the natural language input identifier and representing the context data types(s) needed by the dynamic routing component 275/975.

Once the ASR output data is generated by the ASR component 250/950, the orchestrator component 230/LRO 928 may execute (1194) the shortlister 410 to generate the shortlisted skill data 415 as described herein with respect to FIG. 4. It will be appreciated that, since the orchestrator component 230/LRO 928 executes the context aggregation component 265/965 to generate the context data 1165 at least partially in parallel to executing the ASR component 250/950, the orchestrator component 230/LRO 928 may receive the context data 1165 and send same to the shortlister 410 prior to or in parallel with sending the ASR output data 1155. Thus, when the orchestrator component 230/LRO 928 calls the shortlister 410 to execute, the shortlister 410 may simply process to generate the shortlisted skill data 415.

Once the ASR output data and the shortlisted skill data 415 are generated, the orchestrator component 230/LRO 928 may execute (1196) the NLU component 260/960 to generate the NLU output data 485 as described herein with respect to FIG. 4. It will be appreciated that, since the orchestrator component 230/LRO 928 executes the context aggregation component 265/965 to generate the context data 1135 at least partially in parallel to executing the ASR component 250/950, the orchestrator component 230/LRO 928 may receive the context data 1135 and send same to the NLU component 260/960 prior to or in parallel with sending the ASR output data 1155 and shortlisted skill data 415. Thus, when the orchestrator component 230/LRO 928 calls the NLU component 260/960 to execute, the NLU component 260/960 may simply process to generate the NLU output data 485.

Once the NLU output data is generated, the orchestrator component 230/LRO 928 may execute (1198) the dynamic routing component 275/975 to generate the execution plan data 635 as described herein with respect to FIG. 6. It will be appreciated that, since the orchestrator component 230/LRO 928 executes the context aggregation component 265/965 to generate the context data 1115 at least partially in parallel to executing the ASR component 250/950, the orchestrator component 230/LRO 928 may receive the context data 1115 and send same to the dynamic routing component 275/975 prior to or in parallel with sending the NLU output data 485. Thus, when the orchestrator component 230/LRO 928 calls the dynamic routing component 275/975 to execute, the dynamic routing component 275/975 may simply process to generate the execution plan data 635.

The processing as described above with respect to FIG. 11B may result in decreased user-perceived latency as compared to a system 120/device 110 configured to call the shortlister 410, the NLU component 260/960, and the dynamic routing component 275/975, and the shortlister 410, the NLU component 260/960, and the dynamic routing component 275/975 thereafter individually communicating with the context aggregation component 265/965 in order to receive the context data 1165, 1135, and 1115, respectively.

The description of FIG. 11B above describes processing that may be performed to frontload non-dependent processes represented in the illustrative DAG of FIG. 11A. It will be appreciated that different systems/devices may implement different components having different data dependencies. Accordingly, it will be appreciated that the technique for frontloading non-dependent data processing, described with respect to FIG. 11B, may be applied by various systems/devices, but that the actual data processing that is frontloaded may be different from that described herein above.

To coordinate processing at runtime, components may associate sent data with a unique identifier corresponding to the natural language input presently being processed.

In at least some embodiments, the orchestrator component 230/LRO 928 may, while performing runtime processing of a natural language input, expand a DAG corresponding to the natural language input to include additional functionality to be performed with respect to the natural language input. Expansion of the DAG may be based on data output by a component (represented in the DAG) at runtime.

As described above with respect to FIGS. 11A-11B, the NLU component 260/960 may be executed to generate NLU output data 485. The orchestrator component 230/LRO 928 may process the NLU output data 1185 to determine an intent represented therein. Based on the intent, the orchestrator component 230/LRO 928 may determine a response to the natural language input is to be output as synthesized speech. In response to such a determination, the orchestrator component 230/LRO 928 may query the workflow storage 285/985 for one or more data types needed by the TTS component 280/980 to generate output audio data. In response, the orchestrator component 230/LRO 928 may receive data representing sentiment data (e.g., representing a determined sentiment of the natural language input), whisper data (e.g., representing whether the natural language input includes speech that was whispered), and skill response data (e.g., text data that is responsive to the natural language input). The orchestrator component 230/LRO 928 may then construct a portion of a DAG that includes a node 1210 representing the TTS component 280/280, an edge 1205 representing the TTS component 280/980 outputs output audio data including synthesized speech, an edge 1215 representing the TTS component 280/980 receives sentiment data, an edge 1225 representing the TTS component 280/980 receives whisper data, and an edge 1235 representing the TTS component 280/980 receives skill response data.

After constructing the aforementioned DAG portion for the TTS component 280/980, the orchestrator component 230/LRO 928 may query the workflow storage 285/985 for one or more components that output sentiment data. In response, the orchestrator component 230/LRO 928 may receive an indication of a sentiment component (implemented by the system 120/device 110 to determine a sentiment of the natural language input), and the data type(s) the sentiment component needs to receive in order to generate the sentiment data. The orchestrator component 230/LRO 928 may thereafter generate a portion of the DAG that includes a node 1220 representing the sentiment component (which is connected to the edge 1215 corresponding to sentiment data input to the TTS component 280/980), and an edge 1245 representing the sentiment component receives ASR output data.

After constructing the aforementioned DAG portion for the TTS component 280/980, the orchestrator component 230/LRO 928 may query the workflow storage 285/985 for one or more components that output whisper data. In response, the orchestrator component 230/LRO 928 may receive an indication of a whisper component (implemented by the system 120/device 110 to detect whether a spoken natural language input includes whispered speech), and the data type(s) the whisper component needs to receive in order to generate the whisper data. The orchestrator component 230/LRO 928 may thereafter generate a portion of the DAG that includes a node 1230 representing the whisper component (which is connected to the edge 1225 corresponding to whisper data input to the TTS component 280/980), an edge 1255 representing the whisper component receives audio data representing a spoken natural language input, and an edge 1285 representing the whisper component receives one or more types of context data (e.g., a distance between the user 5 and the device 110 when the user 5 provided the spoken natural language input, a time of day, whether a device was outputting video or audio when the spoken natural language input was received, a brightness level of one or more smart lights corresponding to a same environment as the device 110 that captured the spoken natural language input, etc.).

After constructing the aforementioned DAG portion for the TTS component 280/980, the orchestrator component 230/LRO 928 may query the workflow storage 285/985 for one or more components that output skill response data. In response, the orchestrator component 230/LRO 928 may receive an indication of one or more skills, and the data type(s) the skill(s) needs to receive in order to generate the skill response data. The orchestrator component 230/LRO 928 may thereafter generate a portion of the DAG that includes a node 1240 representing the skill(s) (which is connected to the edge 1235 corresponding to skill response data input to the TTS component 280/980), an edge 1265 representing the skill(s) receives NLU output data, and an edge 1275 representing the skill(s) receives one or more type(s) of context data.

Figure 12A:
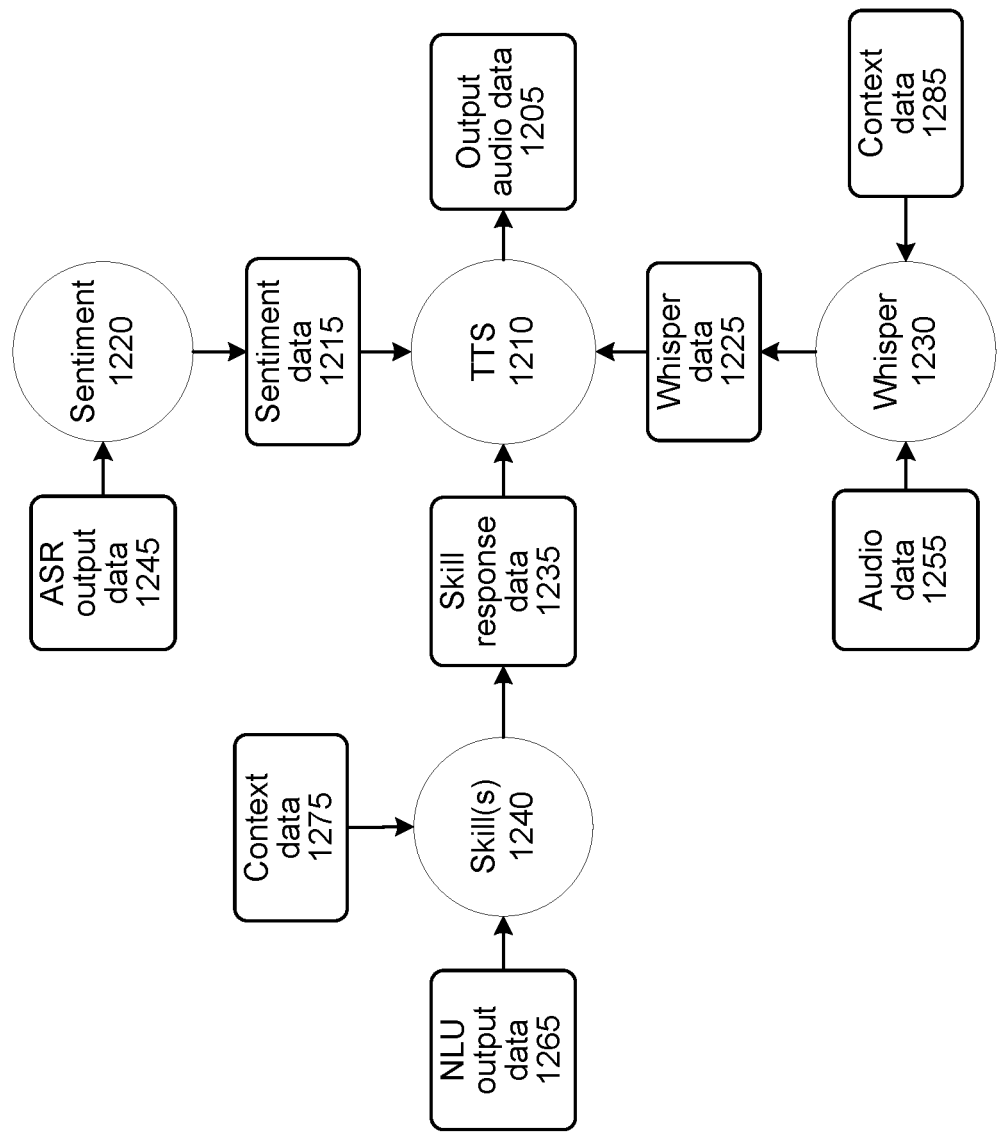
FIG. 12A is a conceptual diagram illustrating a DAG that may be generated while processing of a spoken natural language input is ongoing, according to embodiments of the present disclosure.
Figure 12B:
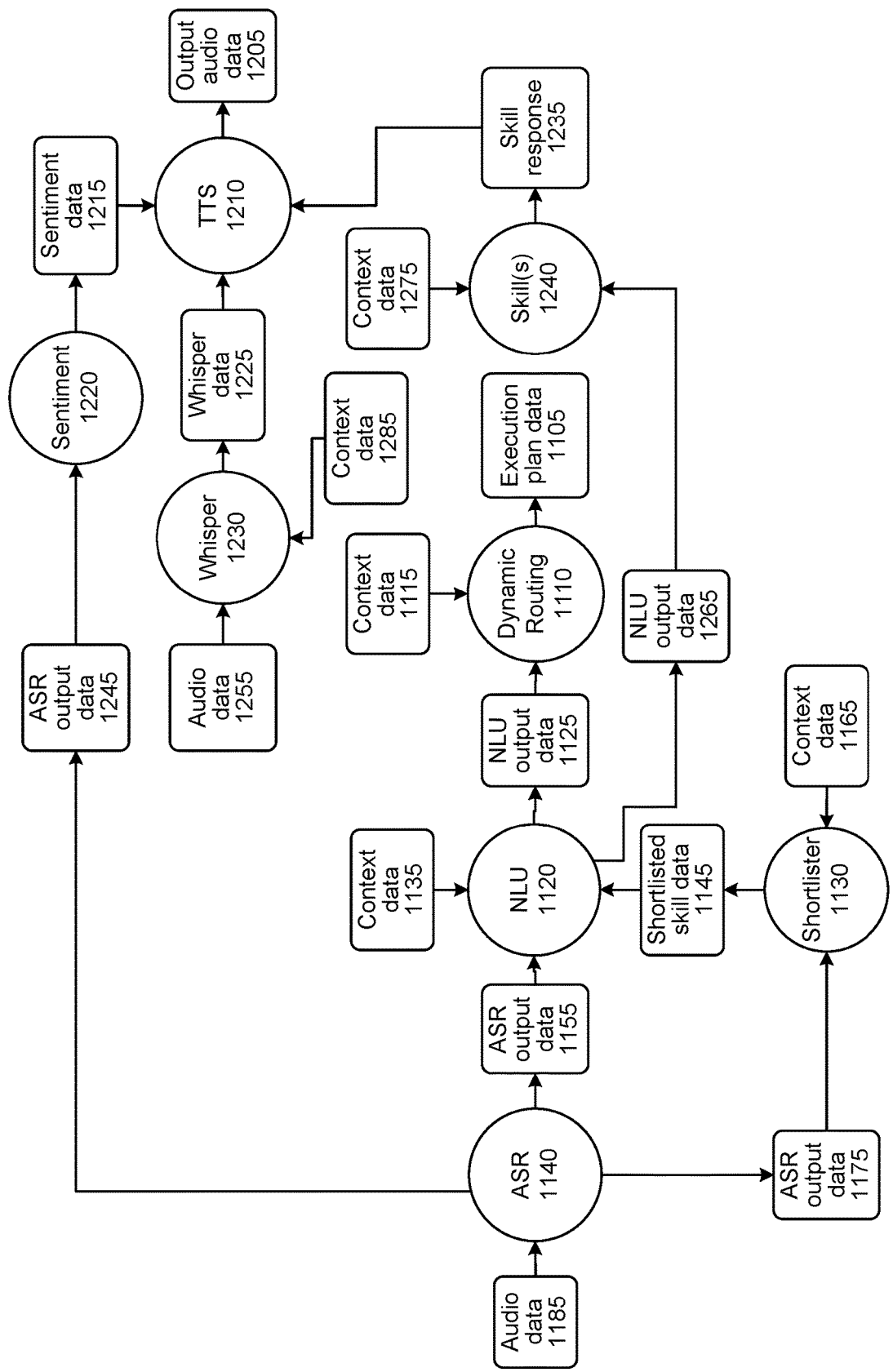
FIG. 12B is a conceptual diagram illustrating the DAG of FIG. 11A updated to include the DAG of FIG. 12A, according to embodiments of the present disclosure.

After generating the DAG illustrated in and described above with respect to FIG. 12A, the orchestrator component 230/LRO 928 may update the DAG illustrated in FIG. 11A (i.e., the initial DAG generated for the natural language input being processed) to include the DAG illustrated in FIG. 12A (i.e., the DAG generated in response to data output by a component of the DAG of FIG. 11A at runtime). FIG. 12B illustrates how the resulting DAG may be represented.

The orchestrator component 230/LRO 928 may be configured to frontload processing in the DAG (represented in FIG. 12A) using a similar technique to that described above with respect to FIG. 11B. For example, the context aggregation component 265/965 may be executed to determine and output the context data 1285 and 1275. As such, once the NLU output data is input to the skill(s), the skill(s) may process as the context data 1275 was prefetched. Moreover, once the audio data 1255 is input to the whisper component, the whisper component may process as the context data 1285 was prefetched. In addition, the sentiment component can be executed as soon as the DAG of FIG. 12A is generated since, as described above, the DAG of FIG. 12A may be generated after NLU output data is generated, which is generated after the ASR output data is output by the ASR component 250/950.

Figure 13:
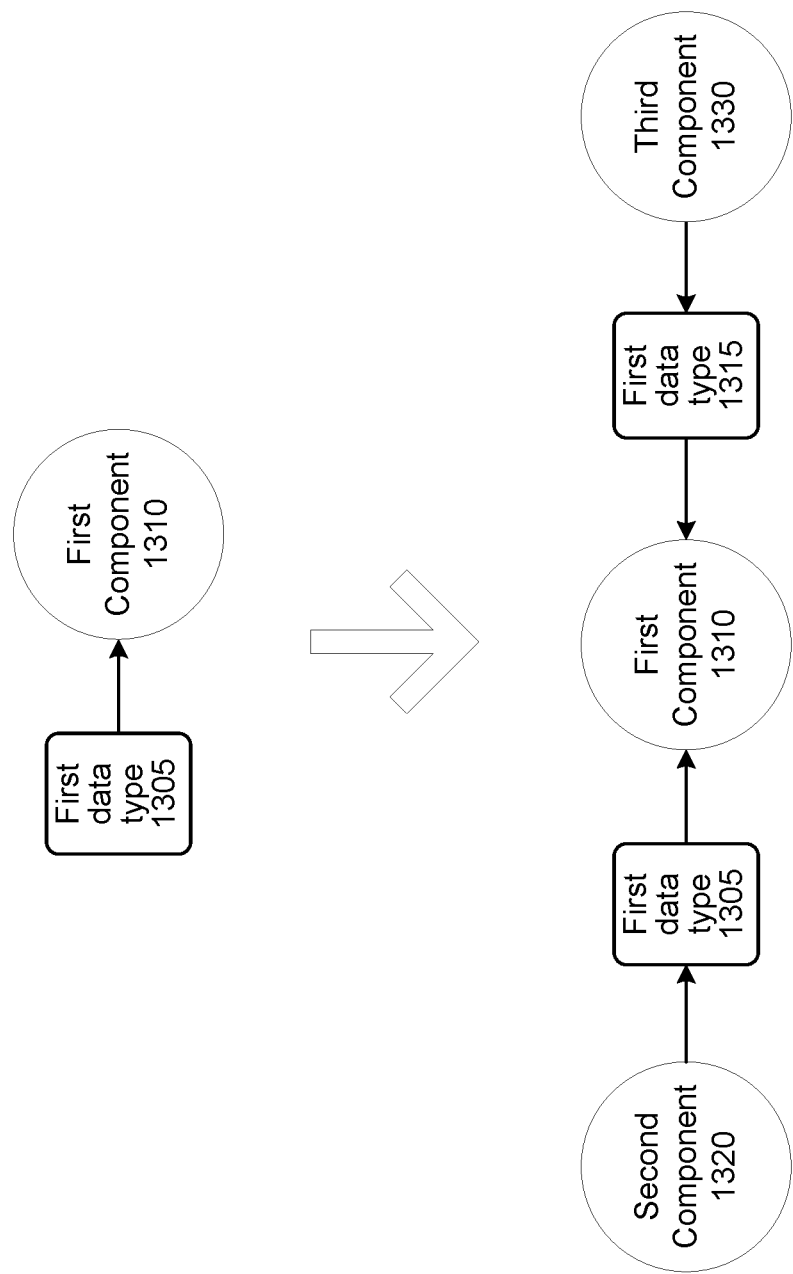
FIG. 13 is a conceptual diagram illustrating how multiple components may be configured to generate a same data type that is to be received by another component, according to embodiments of the present disclosure.

In at least some embodiments, when the orchestrator component 230/LRO 928 queries the workflow storage 285/985 for one or more components capable of outputting a specific type of data, the orchestrator component 230/LRO 928 may receive data indicating multiple different components. Using FIG. 13 as an example, the orchestrator component 230/LRO 928 may initially generate a portion of a DAG including a node 1310 representing a first component, and an edge 1305 representing the first component is to receive a first data type.

Thereafter, the orchestrator component 230/LRO 928 may query the workflow storage 285/985 for one or more components capable of outputting the first data type. In response, the orchestrator component 230/LRO 928 may receive data indicating a second component and a third component. The orchestrator component 230/LRO 928 may then update the initially created DAG portion to include a second node 1320 representing the second component (which is connected to the edge 1305 representing the first data type to be input to the first component), a third node 1330 representing the third component, and a second edge 1315 representing the first data type may be output by the third component and input to the first component. The possible input of the same data type by different components into a single component may be referred to as "scatter-gather."

When the DAG includes a scatter-gather portion, the orchestrator component 230/LRO 928 may cause the various components to execute at least partially in parallel, and may provide the first received data to the receiving component. Using the bottom illustrated DAG portion of FIG. 13 as an example, the orchestrator component 230/LRO 928 may cause the second component to process at least partially in parallel to the third component. In other words, the orchestrator component 230/LRO 928 may simultaneously call the second and third components to execute. Once the orchestrator component 230/LRO 928 receives the first data type from one of the components (or the first component receives the first data type from one of the components, in the situation where the components communicate directly), the component that generates but has not yet output the first data type may be sent an instruction to cease processing. Accordingly, in a scatter-gather scenario, the orchestrator component 230/LRO 928 may call all components capable of generate a type of data in an effort to get the type of data generated as quickly as possible (as selective calling of a component may result in the orchestrator component 230/LRO 928 calling a component that cannot generate the data type the quickest given current processing load, etc.).

Figure 14:
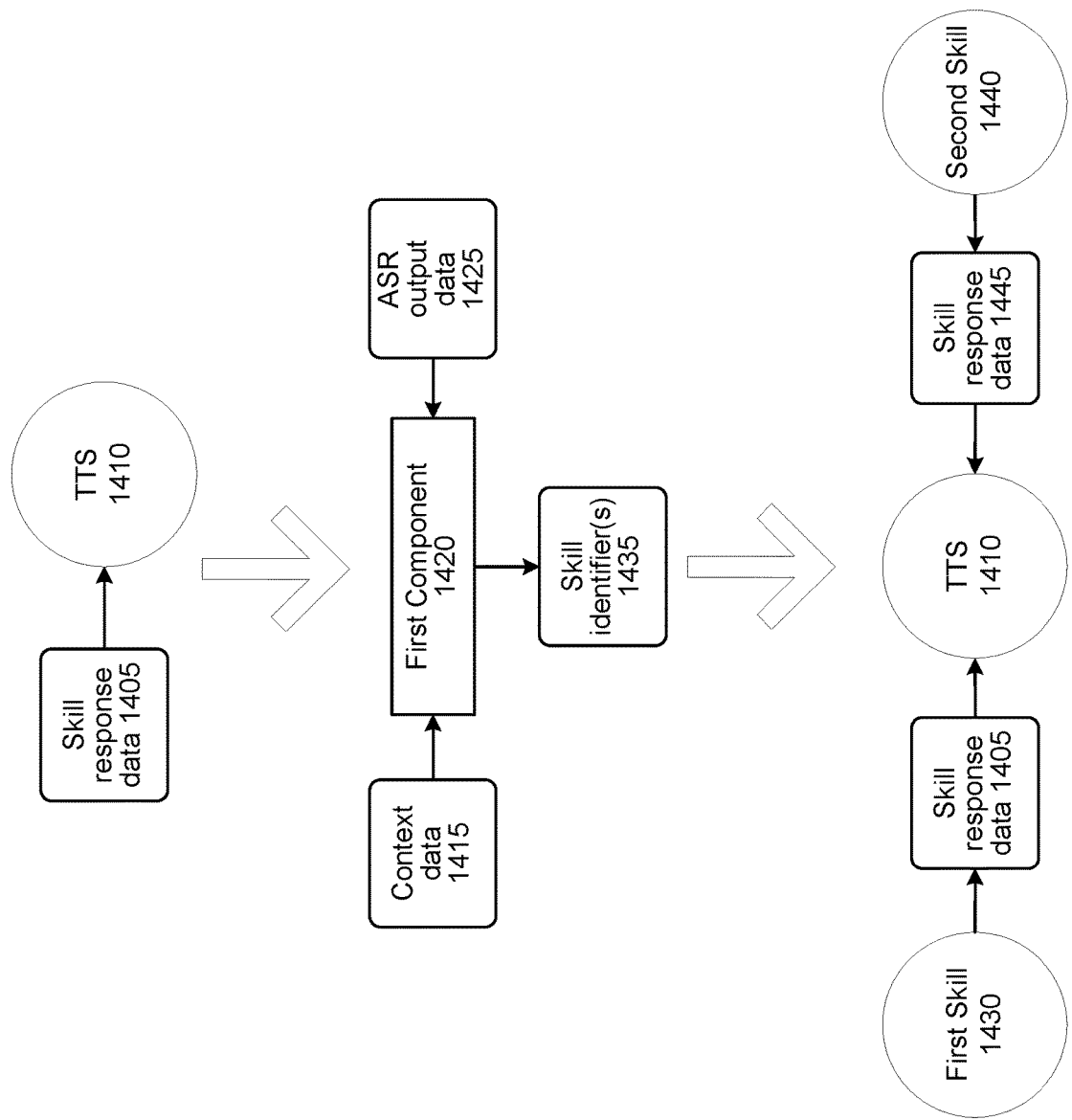
FIG. 14 is a conceptual diagram illustrating how a DAG may be closed during runtime processing, according to embodiments of the present disclosure.

In at least some situations, when the orchestrator component 230/LRO 928 is construction a DAG for a newly received natural language input, the DAG may include a data type that is to be input to a first component, but when commencing processing of the natural language input the orchestrator component 230/LRO 928 may not know exactly which component should be executed to generate the data type. Using FIG. 14 as an example, when the orchestrator component 230/LRO 928 constructs a DAG for a newly received natural language input, the DAG may include a node 1410 representing the TTS component 280/980, and an edge 1405 representing skill response data is to be input to the TTS component 280/980. However, the system 120/device 110 may be configured with numerous (e.g., thousands of) skills and the orchestrator component 230/LRO XXW28 may not know (at the moment when the initial DAG is generated) which skill will be called.

The orchestrator component 230/LRO 928 may be in communication with a component (implemented by the system 120/LOR 928) that may be configured to update a portion of a DAG to indicate a component from which a data type is to be output. Keeping with the example of FIG. 14, the orchestrator component 230/LRO 928 may communicate with a first component 1420 that receives context data 1415 (e.g., corresponding to the context data types considered by the dynamic routing component 275/975) and ASR output data 1425, and determines therefrom data 1435 representing a skill(s) (e.g., data including one or more skill identifier(s)) that is likely capable of handling the natural language input. Thus, once the initial DAG is generated (which does not indicate exactly which skill(s) will be called), the context aggregation component 265/965 may be executed to generate and output the context data. Thereafter, once ASR output data is output from the ASR component 250/950, the first component 1420 may be executed with respect to the context data 1415 and the ASR output data 1425 to generate the data 1435 representing one or more skills. The orchestrator component 230/LRO 928 may then use this data to update the initially generated DAG portion (represented along the top of FIG. 14) to reflect one or more nodes corresponding to the one or more skills (illustrated as nodes 1430 and 1440 for purposes of illustration, although more skill nodes may be generated) connected to the TTS component node 1410 by edges 1405 and 1445 corresponding to skill response data (as illustrated along the bottom of FIG. 14).

Once the DAG is updated, the orchestrator component 230/LRO 928 may cause all non-dependent data processing to be performed at least partially in parallel, as described herein above. Continuing with the example of FIG. 14, the context aggregation component 265/965 may be executed to generate and output context data usable by the first and second skills, such that the first and/or second skill may process to generate a skill response later on without having to invoke the context aggregation component 265/965 after the first and/or second skill is called to process.

Figure 15A:
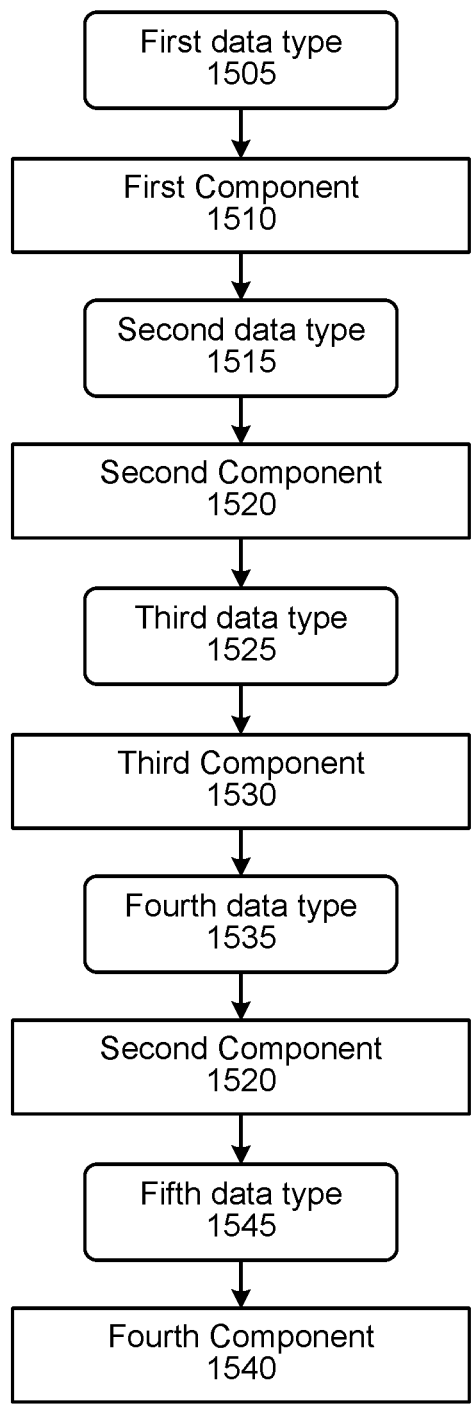
FIG. 15A is a process flow diagram illustrating an example hard-coded processing workflow, according to embodiments of the present disclosure.

In at least some situations, the orchestrator component 230/LRO 928 may be configured with a hard-coded processing workflow. Using FIG. 15A as an example, the orchestrator component 230/LRO 928 may be configured to send a first data type 1505 to a first component 1510, then send a second data type 1515 (output by the first component 1510) to a second component 1520, then send a third data type 1535 (output by the second component 1520) to a third component 1530, then send a fourth data type 1535 (output by the third component 1530) to the second component 1520, and then send a fifth data type 1545 (output by the second component 1520) to a fourth component 1540. It will be appreciated that the hard-coded processing workflow illustrated in FIG. 15A is merely illustrative, and that a hard-coded processing workflow may include more or less steps than that illustrated and described.

In at least some situations, it may be desirable to have the orchestrator component 230/LRO 928 process at runtime using DAGs, rather than having the orchestrator component 230/LRO 928 implement the hard-coded processing workflow. However, due to manpower constraints, available computing cost, etc., it may not be beneficial to rewrite an entire hard-coded processing workflow such that its components, data inputs, and data outputs may be restructured to be implemented at runtime according to DAGs.

In at least some embodiments, the hard-coded processing workflow may be left intact and, when a new component is to be implemented by the system 120/device 110, the new component, its input data, and its output data may be represented using DAGs that are associated with the hard-coded processing workflow (but that are not hard-coded into the processing workflow). Using FIG. 15B as an example, the system 120/device 110 may, after hard-coding the processing workflow illustrated in FIG. 15A, be configured to implement a fifth component that outputs a sixth data type 1555.

The sixth data type 1555, output by the new fifth component, may be received by a component represented in the hard-coded processing workflow. For example, with reference to FIG. 15B, the sixth data type 1555 to be received by the fourth component 1540.

To facilitate sending of the sixth data type 1555, from the new fifth component, to a hard-coded component, a GET operation may be inserted into the hard-coded processing workflow. Using FIG. 15B as an example, a GET operation 1504, for the sixth data type 1555, may be inserted into the hard-coded processing workflow at or near a beginning of the hard-coded processing workflow. The GET operation may not indicate the sixth data type 1555 is to be provided by any particular component of the system 120/device 110.

Figure 15B:
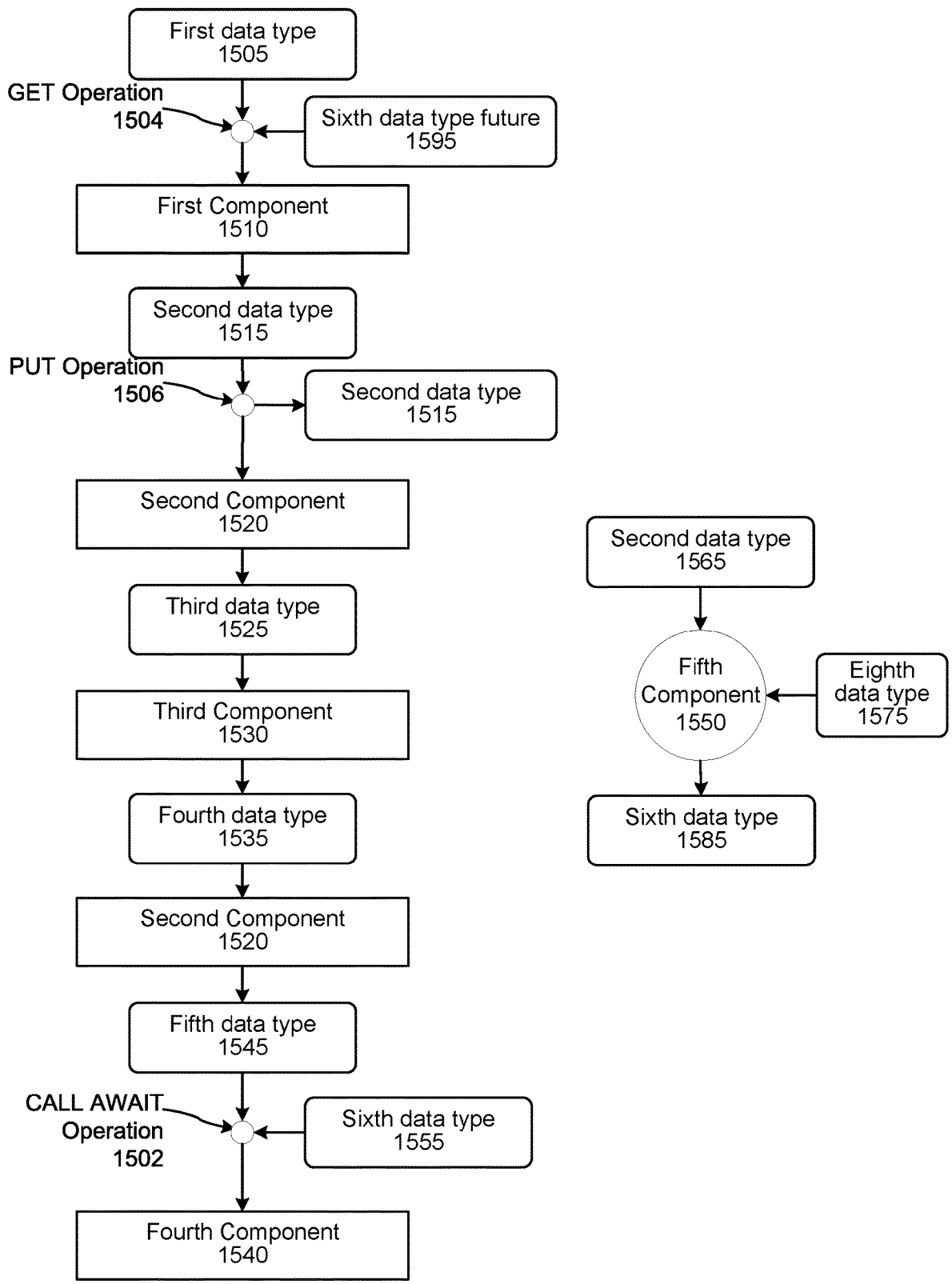
FIG. 15B is a conceptual diagram illustrating how a hard-coded processing workflow may be implemented in conjunction with one or more DAGs, according to embodiments of the present disclosure.

As illustrated in FIG. 15B, since the sixth data type 1555 is to be received by the fourth component 1540, a CALL AWAIT operation 1502 may be inserted into the hard-coded processing workflow just prior to the fourth component 1540.

At runtime, when the orchestrator component 230/LRO 928 gets to the GET operation 1504 in the hard-coded processing workflow, the orchestrator component 230/LRO 928 may query the workflow storage 285/985 for data indicating one or more components that are capable of outputting the sixth data type. In response, the orchestrator component 230/LRO 928 may receive data indicating the fifth component, and data to be received by the fifth component. Thereafter, the orchestrator component 230/LRO 928 may generate a DAG including a node 1550 representing the fifth component, one or more edges representing the data types to be received by the fifth component (while the right portion of FIG. 15B illustrates the DAG as having 2 input edges 1565 and 1575, it will be appreciated that the node 1550 may have varying numbers of edges representing input data, without departing from the present disclosure), and an edge 1585 representing the sixth data type 1585.

In response to the orchestrator component 230/LRO 928 executing the GET operation 1504, the orchestrator component 230/LRO 928 may receive a future 1595 for the sixth data type. The future 1595 represents a promise to provide the sixth data type in the future. Various futures as known in the art may be used, including but not limited to Java Futures and Scala Futures.

After executing the GET operation 1504, the orchestrator component 230/LRO 928 may execute the hard-coded processing workflow (in parallel with the orchestrator component 203/LRO 928 coordinating processing of the DAG) until the orchestrator component 230/LRO 928 reaches the position in the hard-coded processing workflow corresponding to the CALL AWAIT operation 1502. When the orchestrator component 230/LOR 928 gets to the CALL AWAIT operation 1502, the orchestrator component 230/LOR 928 may identify the previously received future 1595 (from storage) and wait for the sixth data type 1555 to be output by the fifth component.

Since, as described above, the orchestrator component 230/LRO 928 coordinates processing of the DAG in parallel with execution of the hard-coded processing workflow, there may be instances where the fifth component outputs the sixth data type 1555 prior to the orchestrator component 230/LRO 928 getting to the CALL AWAIT operation 1502 in the hard-coded processing workflow. In such instances, when the orchestrator component 230/LRO 928 executes the CALL AWAIT operation 1502, the future 1595 may be identified along with the already provided sixth data type 1555, and the orchestrator component 230/LRO 928 may send the already received sixth data type 1555 to the fourth component 1540.

In instances where the sixth data type 1555 is not output by the fifth component 1550 prior to the orchestrator component 230/LRO 928 executing the CALL AWAIT operation 1502, the orchestrator component 230/LRO 928 may receive the future 1595 and simply wait for the sixth data type 1555 to be output by the fifth component, at which time the orchestrator component 230/LRO 928 may receive the sixth data type 1555 and provide same to the fourth component 1540.

While FIG. 15B illustrates a single pair of GET/CALL AWAIT operations, one skilled in the art will appreciate that the hard-coded processing workflow may include various pairs of corresponding GET/CALL AWAIT operations. When the hard-coded processing workflow includes various pairs of GET/CALL AWAIT operations, the GET operations may all be positioned at or near a front of the hard-coded processing workflow, while the corresponding CALL AWAIT operations may be positioned at various locations within the hard-coded processing workflow.

As illustrated in FIG. 15B, the hard-coded processing workflow may also include at least one PUT operation 1506. As used herein, a PUT operation may represent processing, performed by the orchestrator component 230/LRO 928, to send data (generated during processing of a hard-coded processing workflow) into a DAG generated for the natural language input. Using FIG. 15B as an example, the orchestrator component 230/LRO 928 may generate a DAG for a fifth component and may use a PUT operation to send a second data type 1515 (generated from processing of the first component 1510) to the DAG for processing by the fifth component. It will be appreciated that the foregoing is merely illustrative, and a single hard-coded processing workflow may be include more than one PUT operation (which may be located at various positions in the hard-coded processing workflow) for triggering the sending of data to one or more DAGs.

Figure 15C:
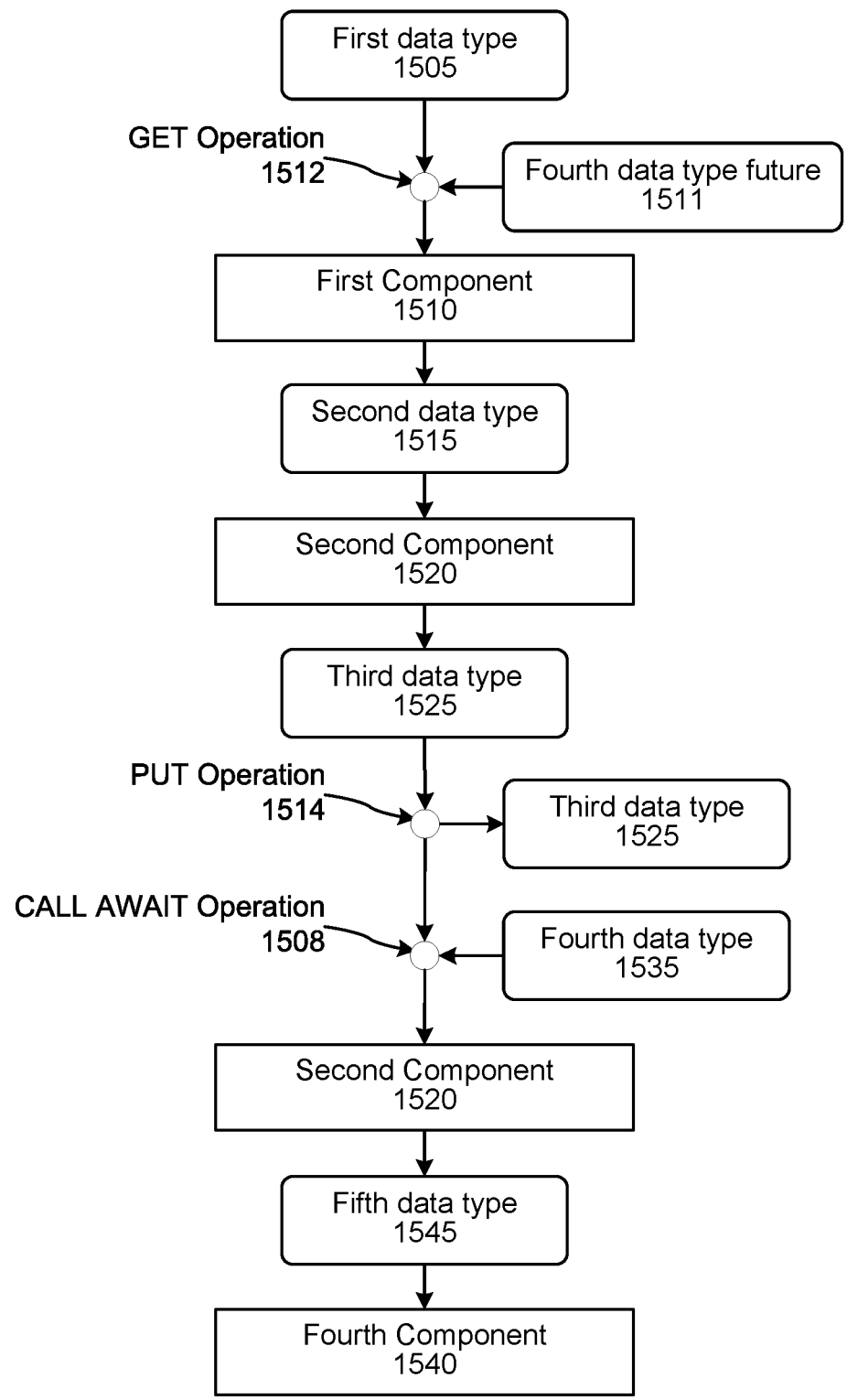
FIG. 15C is a conceptual diagram illustrating how a component, of a hard-coded processing workflow, may be transitioned to a DAG implementation, according to embodiments of the present disclosure.

In at least some situations, components may be transitioned from a hard-coded processing workflow to a DAG implementation on a component-by-component basis. If a component is to be removed from a hard-coded processing workflow and implemented using a DAG, (1) each type of output data of the component may be replaced with a different CALL AWAIT operation in the hard-coded processing workflow, (2) one or more corresponding GET operations (that return futures for the component output data) may be positioned at or near the beginning of the hard-coded processing workflow, (3) each type of input data to the component may be replaced with a different PUT operation in the hard-coded processing workflow, and (4) the component's processes may be removed from the hard-coded processing workflow. For example, it may be desired to transition the third component 1530 (illustrated in FIGS. 15A-15B) to be implemented according to the DAG techniques described herein above. In such an example and with reference to FIG. 15C, the fourth data type 1535 (capable of being output by the third component 1530) may be replaced with a CALL AWAIT operation 1508 for the fourth data type 1535. In addition, a GET operation 1512 (that results in a future 1511 for the fourth data type) may be positioned at or near a beginning of the hard-coded processing workflow. Moreover, a PUT operation 1514 (to send the third data type 1525 to a DAG representing the third component 1530) may be positioned in the hard-coded processing workflow somewhere between the first and second instances of the second component 1520 (but in any event before the CALL AWAIT operation 1508). Lastly, the portion of the hard-coded processing workflow, corresponding to processing performed by the third component 1530, may be removed from the hard-coded processing workflow and the third component 1530, the data input to the third component, and the data output from the third component may be represented in the workflow storage 285/985. It is within the knowledge of one skilled in the art to adapt the foregoing operations to transition various components of a hard-coded processing workflow, on an as-desired component-by-component transition basis.

Figure 16:
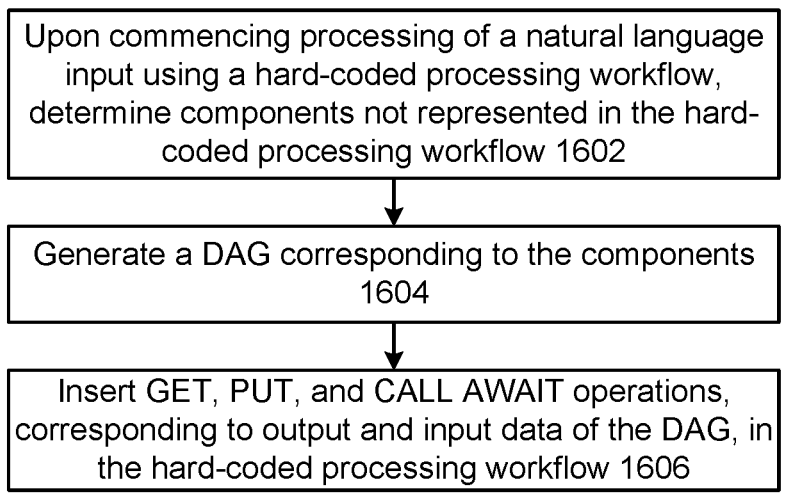
FIG. 16 is a process flow diagram illustrating how one or more DAGs may be generated at runtime when a hard-coded processing workflow is implemented, according to embodiments of the present disclosure.

In at least some embodiments, when the orchestrator component 230/LRO 928 implements a hard-coded processing workflow, the workflow storage 285/985 may store data with respect to components not represent in the hard-coded processing workflow. In such embodiments (with respect to FIG. 16), upon the orchestrator component 230/LRO 928 commencing runtime processing of a natural language input using the hard-coded processing workflow, the orchestrator component 230/LOR 928 may determine (1602) components not represented in the hard-coded processing workflow. For example, the workflow storage 285/985 may only store data regarding components not represented in the hard-coded processing workflow, and the orchestrator component 230/LRO 928 may query the workflow storage 285/985 for data representing components stored therein (e.g., component identifiers and corresponding input and output data).

After receiving the component data, the orchestrator component 230/LRO 928 may generate (1604) a DAG corresponding to the component data. Such processing is described in detail herein with respect to FIG. 11A.

After generating the DAG, the orchestrator component 230/LRO 928 may insert (1606) GET, PUT, and CALL AWAIT operations within the hard-coded processing workflow where appropriate based on the input and output data represented in the DAG. It will be appreciated that the runtime processing of FIG. 16 enables components to be added and deactivated with respect to runtime processing without having to perform offline changes to the hard-coded processing workflow.

Figure 17:
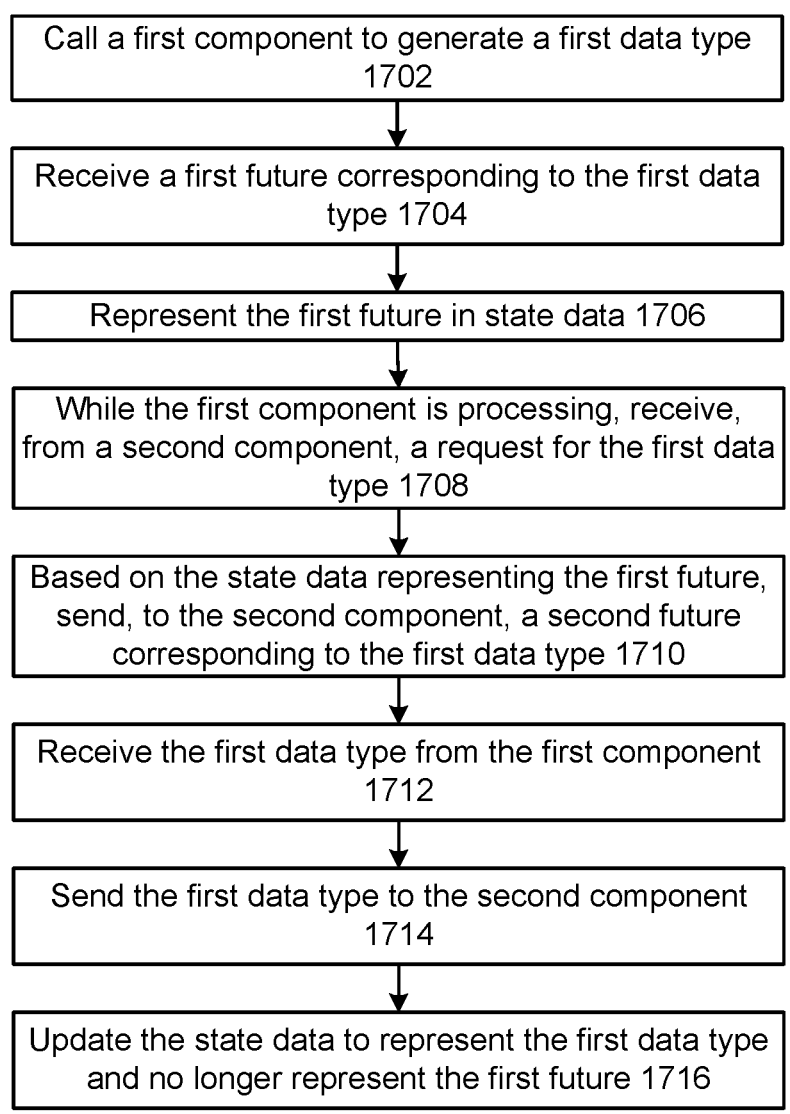
FIG. 17 is a process flow diagram illustrating how state data may be maintained and used to prevent duplicate calling of a processing component, according to embodiments of the present disclosure.
Figure 18:
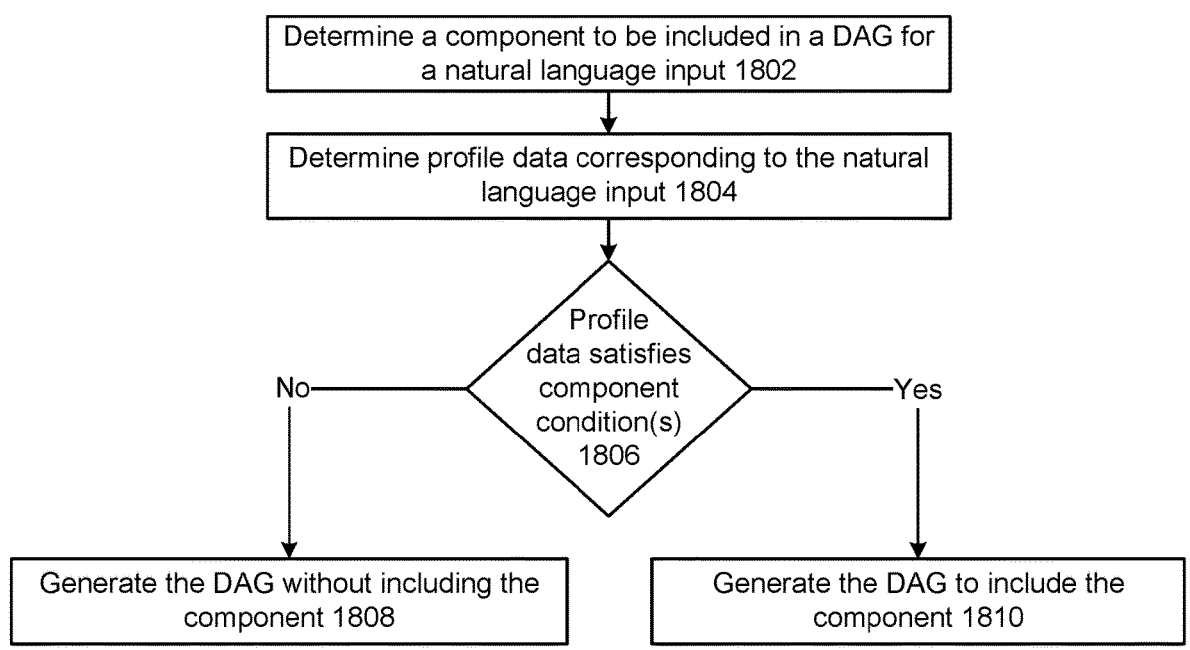
FIG. 18 is a process flow diagram illustrating how a DAG may be generated based on conditional processing requirements of a processing component, according to embodiments of the present disclosure.

It will be appreciated that the orchestrator component 230/LRO 928 may have various futures (in response to GET operations) outstanding at any given moment (i.e., awaiting a corresponding output from the DAG generated for the particular natural language input). In at least some embodiments, the orchestrator component 230/LRO 928 may maintain state tracker data representing ongoing processes. Such may enable the orchestrator component 230/LRO 928 from sending duplicate calls to a component that is presently processing. As an example and with reference to FIG. 17, the orchestrator component 230/LRO 928 may call (1702) a first component to generate a first data type (via a GET operation) and may in turn receive (1704) a first future for the first data type, which the orchestrator component 230/LRO 928 may represent (1706) in state data. While the first component is processing, the orchestrator component 230/LRO 928 may receive (1708), from a second component, a request for the first data type. Based on the state data, rather than the orchestrator component 230/LRO 928 calling the first component a second time to generate the first data type, the orchestrator component 230/LRO 928 may send (1710), to the second component, a second future (different from the future received by the orchestrator component 230/LRO 928 at step 1704) corresponding to the first data type. Thereafter, when the orchestrator component 230/LRO 928 receives (1712) the first data type from the first component, the orchestrator component 230/LRO 928 may send (1714) the first data type to the second component, and may update (1716) the state data to represent the first data type and no longer represent the first future. As a result of such updating of the state data, if a third component thereafter outputs (to the orchestrator component 230/LRO 928) a request for the first data type, the orchestrator component 230/LRO 928 may respond by sending, to the third component, a third future with the first data type completed.

In at least some embodiments, inclusion of a component, within a DAG, may be conditional. For example, inclusion of a component within a DAG may be condition upon an age of the user, a location of the user, a language of the user, and/or other user information represented in a user profile. Thus, in at least some embodiments, the orchestrator component 230/LRO 928 may determine (1802) a component to be included in a DAG (e.g., in response to querying the workflow storage 285/985) for a natural language input.

The orchestrator component 230/LRO 928 may also determine (1804) profile data corresponding to the natural language input. For example, the orchestrator component 230/LRO 928 may query the profile storage 270/970 for profile data corresponding to a user identifier (or top-scoring user identifier) output by the user recognition component 295/995.

The orchestrator component 230/LRO 928 may determine (1806) whether the profile data satisfies conditions corresponding to the component (e.g., whether the profile data represents a minimum user age corresponding to the component, whether the profile data represents a geographic location corresponding to the component, whether the profile data represents a language corresponding to the component, etc.). If the orchestrator component 230/LRO 928 determines the profile data does not satisfy the component's condition(s), the orchestrator component 230/LRO 928 generates (1808) the DAG without including the component. Conversely, if the orchestrator component 230/LRO 928 determines the profile data satisfies the component's condition(s), the orchestrator component 230/LRO 928 generates (1810) the DAG to include the component.

In at least some embodiments, the system 120/device 110 may be configured to generate responses to natural language inputs to seem as if the responses are coming from different personalities (e.g., different virtual assistants). Each "virtual assistant" may be associated with a unique set of TTS parameters (e.g., prosody, pitch, tone, word choice, etc.) corresponding to a unique synthesized voice. In at least some embodiments, each virtual assistant may be associated with a unique set of non-TTS processing (e.g., a unique set of NLU processing, a unique set of dynamic routing processing, etc.). In at least some embodiments, the system 120/device 110 may be configured with multiple orchestrator components/LRO, with each orchestrator component/LRO configured to generate DAGs representing components, input data, and output data usable to generate responses unique to a particular virtual assistant.

It has been described in detail herein how the system 120/device 110 may process at runtime in response to natural language input. It will be appreciated that the present disclosure is not limited thereto. For example, the device 110 may receive sensor data (e.g., output from a motion sensor in response to the motion sensor detecting movement). In response, the system 120/device 110 may determine a pre-stored action associated with the sensor data, and may perform the runtime processing described herein to perform the action. In a further example, the device 110 may capture one or more images representing a gesture being performed by the user 5. In response, the system 120/device 110 may determine a pre-stored action associated with the gesture, and may perform the runtime processing described herein to perform the action.

The present disclosure also describes processing that may be executed to perform a single action responsive to a user input. However, the present disclosure is not limited thereto, and it is within the knowledge of one skilled in the art to adapt the teachings herein to perform multiple actions in response to a single user input.

Moreover, the teachings herein may be adapted to be performed in response to non-user inputs. For example, the device 110 may indicate when the device 110 is at a particular location (e.g., a geographic location or a particular location within a building). In response to the device 110 being at the particular location, the system 120/device 110 may perform processing described herein to generate perform an action responsive to a pre-established user input associated with the location. For further example, the user 5 may have a preference indicate a natural language input is to be processed at a particular time of day. Thereafter, the system 120/device 110 may determine a present time of day corresponds to the user preference, and may process as described herein with respect to the stored natural language input. One skilled in the art will appreciate that the foregoing examples are merely illustrative, and that the teachings herein may be adapted to situations in which the system 120/device 110 may process in response to other non-user inputs.

Figure 19:
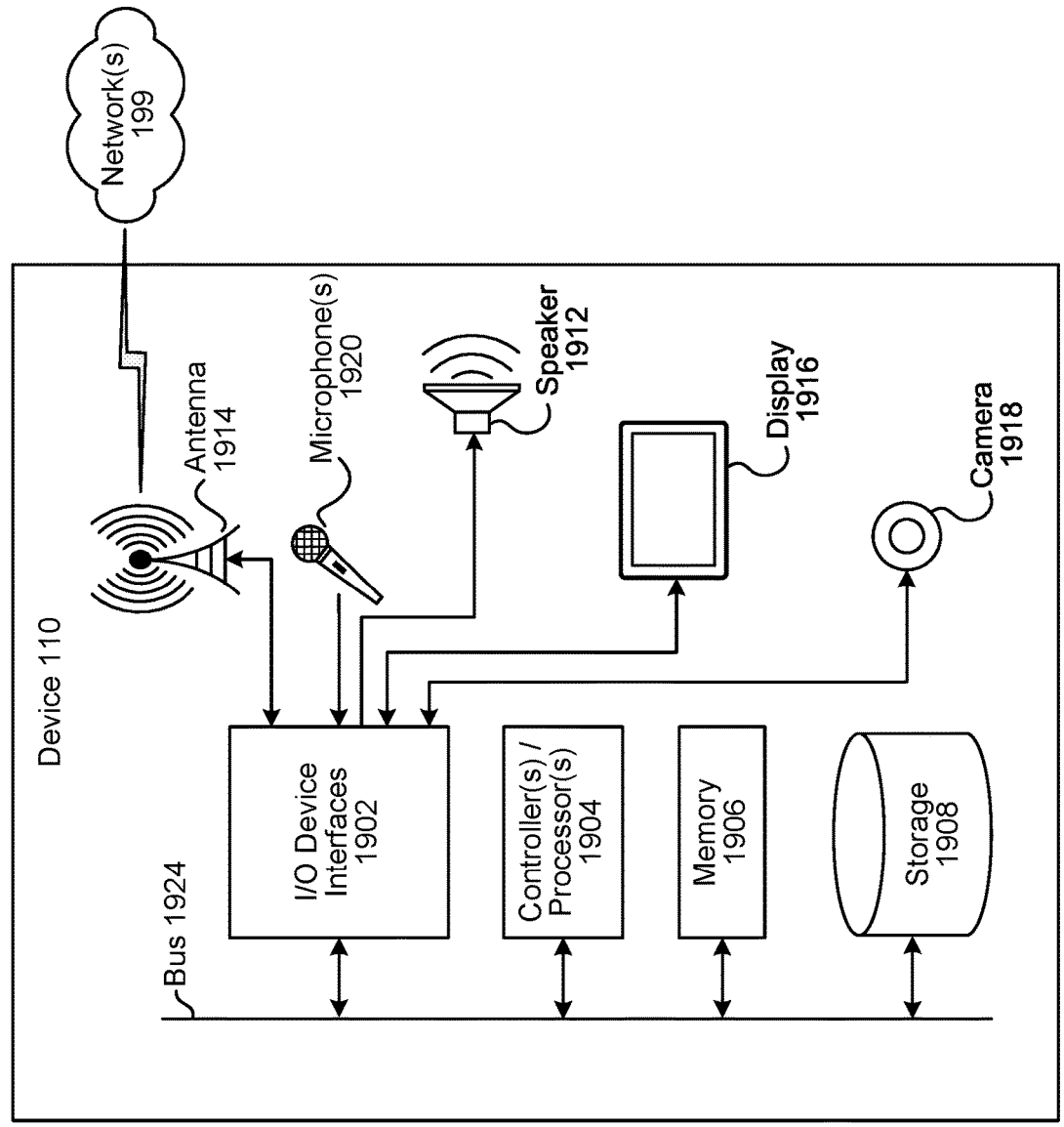
FIG. 19 is a block diagram conceptually illustrating example components of a device, according to embodiments of the present disclosure.
Figure 20:
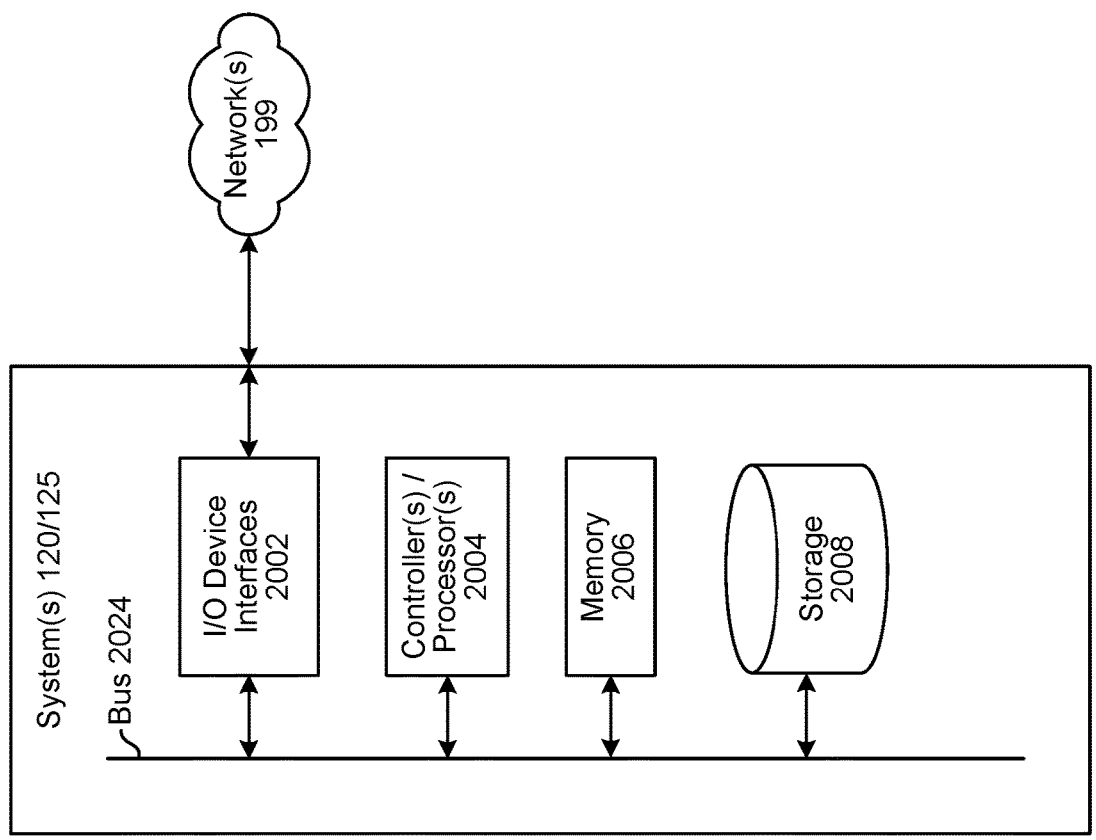
FIG. 20 is a block diagram conceptually illustrating example components of a system, according to embodiments of the present disclosure.

FIG. 19 is a block diagram conceptually illustrating example components of a device 110 according to the present disclosure. FIG. 20 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1904/2004), which may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive memory (MRAM), and/or other types of memory. Each device (110/120/125) may also include a data storage component (1908/2008) for storing data and controller/processor-executable instructions. Each data storage component (1908/2008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1902/2002).

Computer instructions for operating each device (110/120/125) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/120/125) includes input/output device interfaces (1902/2002). A variety of components may be connected through the input/output device interfaces (1902/2002), as will be discussed further below. Additionally, each device (110/120/125) may include an address/data bus (1924/2024) for conveying data among components of the respective device. Each component within a device (110/120/125) may also be directly connected to other components in addition to (or instead of) being connected to other components across the bus (1924/2024).

Referring to FIG. 19, the device 110 may include input/output device interfaces 1902 that connect to a variety of components such as an audio output component such as a speaker 1912, a wired headset or a wireless headset (not illustrated), or other component capable of outputting audio. The device 110 may also include an audio capture component. The audio capture component may be, for example, a microphone 1920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1916 for displaying content. The device 110 may further include a camera 1918.

Via antenna(s) 1914, the input/output device interfaces 1902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1902/2002) may also include communication components that allow data to be exchanged between devices such as different physical servers in a collection of servers or other components.

The components of the device 110, the system 120, and/or a skill component 125 may include their own dedicated processors, memory, and/or storage. Alternatively, one or more of the components of the device 110, the system 120, and/or a skill component 125 may utilize the I/O interfaces (1902/2002), processor(s) (1904/2004), memory (1906/2006), and/or storage (1908/2008) of the device(s) 110, system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill component 125, as described herein, are illustrative, and may be located as a stand-alone device or may be included, in whole or in part, as a component of a larger device or system.

Figure 21:
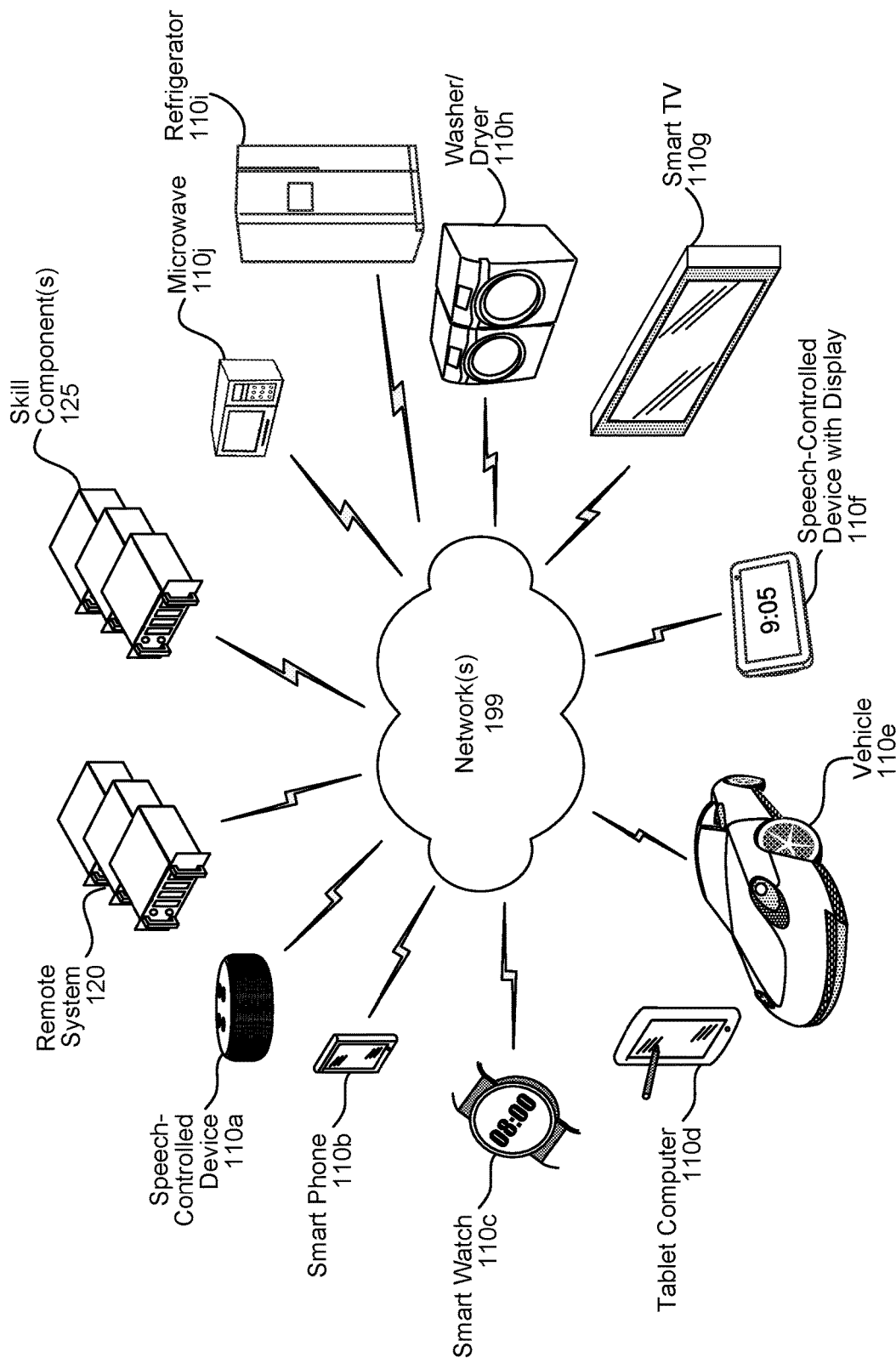
FIG. 21 illustrates an example of a computer network for use with the overall system, according to embodiments of the present disclosure.

As illustrated in FIG. 21, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
generating first workflow data representing processing capable of being performed in response to a spoken user input, the first workflow data representing:
 a first component outputs a first data type representing a context,
 a second component outputs a second data type, and
 a third component receives the first data type and the second data type, and outputs a component identifier representing a component configured to execute natural language understanding (NLU) results data to generate a response to a spoken input;
after generating the first workflow data, receiving, from a first device, first audio data representing a first spoken input;
in response to receiving the first audio data, determining the third component is to execute with respect to the first spoken input;
using the first workflow data, generating a directed acyclic graph (DAG) representing processing to be performed with respect to the first spoken input, wherein generating the DAG comprises:
 determining a first node to represent the third component,
 determining a first edge representing the first data type is to be input to the third component,
 after determining the first node and the first edge, determining a second node to represent the first component, and
 after determining the second node, configuring the first edge to represent the first data type is to be output from the first component and input to the third component;
using an automatic speech recognition (ASR) component, processing the first audio data to generate first ASR results data corresponding to a transcript of the first spoken input;
using an NLU component, processing the first ASR results data to generate first NLU results data indicating at least an intent of the first spoken input;
based on the DAG and at least partially in parallel to processing of at least one of the ASR component and the NLU component, executing the first component to output first data corresponding to the first data type, the first data representing a first context;
processing, using the third component, the first data and the first NLU results data to output a first component identifier indicating a fourth component configured to determine a response to the first spoken input; and
executing the fourth component to process the first NLU results data to determine the response to the first spoken input.

2. The computer-implemented method of claim 1, further comprising:
after receiving the first audio data, receiving second data representing a fifth component that is configured to receive a third data type and output the first data type, wherein the fifth component is unrepresented in the first workflow data; and
generating the DAG to further represent the fifth component is to receive the third data type and is to output the first data type.

3. The computer-implemented method of claim 1, further comprising:
determining a plurality of orchestrator components comprising:
 a first orchestrator component associated with first text-to-speech (TTS) parameters corresponding to a first synthesized voice, and
 a second orchestrator component associated with second TTS parameters corresponding to a second synthesized voice;
determining the first orchestrator component caused the DAG to be generated;
receiving text data from the fourth component, the text data corresponding to the response to the first spoken input; and
based at least in part on determining the first orchestrator component caused the DAG to be generated, using the first TTS parameters to perform TTS processing on the text data to generate second audio data representing synthesized speech corresponding to the first synthesized voice.

4. The computer-implemented method of claim 1, further comprising:
determining a code base representing a first workflow in which a plurality of components are to process in response to a spoken input, the plurality of components comprising a fifth component;
determining, in the code base, that the fifth component receives a third data type and outputs a fourth data type;
placing, at a first location in the code base proximate to a beginning of the code base, a GET operation for the third data type;
placing, at a second location in the code base corresponding to the third data type, a PUT operation corresponding to the third data type;
placing, at a third location in the code base corresponding to the fourth data type, a CALL AWAIT operation corresponding to the fourth data type; and
removing, from the code base, a portion of the code base corresponding to processing performed by the fifth component.

5. A computer-implemented method comprising:
receiving first data representing a first natural language input;
prior to performing natural language understanding (NLU) processing, determining a first component is to execute with respect to the first natural language input, the first component to be invoked after NLU output data is generated for the first natural language input;
generating a graph representation of processing to be performed in response to the first natural language input, wherein generating the graph representation comprises:
 generating a first graph portion representing the first component is to receive a first data type representing a context and the NLU output data, and is to output a component identifier representing a component configured to determine a response to the first natural language input, and after generating the first graph portion, generating a second graph portion representing a second component is to output the first data type;

performing NLU processing on the first data to generate first NLU output data representing the first natural language input;

based on the graph representation and at least partially in parallel to performing the NLU processing, causing the second component to execute to output second data corresponding to the first data type, the second data representing a first context;

processing, using the first component, the second data and the first NLU output data to output a first component identifier indicating a third component configured to determine the response to the first natural language input; and causing the third component to process the first NLU output data to determine the response to the first natural language input.

6. The computer-implemented method of claim 5, further comprising:

prior to receiving the first data, generating first workflow data representing processing capable of being performed in response to a natural language input, the first workflow data at least partially representing:

the first component receives the first data type and the NLU output data, and outputs the component identifier, the second component outputs the first data type, and a fourth component receives a third data type and outputs the NLU output data.

7. The computer-implemented method of claim 6, wherein generating the first workflow data comprises generating the first workflow data to represent processing capable of being performed in response to a non-spoken natural language input, and wherein the computer-implemented method further comprises:

generating second workflow data representing components capable of processing in response to a spoken natural language input.

8. The computer-implemented method of claim 6, further comprising:

after receiving the first data, receiving third data representing a fifth component outputs a fourth data type, wherein the fifth component is unrepresented in the first workflow data, wherein generating the graph representation further comprises:

generating the first graph portion to represent the first component is to receive the fourth data type, and after generating the first graph portion, generating a third graph portion representing the fifth component is to output the fourth data type.

9. The computer-implemented method of claim 5, wherein the graph representation is a directed acyclic graph (DAG), and wherein generating the DAG further comprises:

generating first node data including a second component identifier corresponding to the first component;

generating first edge data associated with the first node data, the first edge data representing the first data type is to be input to the first component; and after generating the first node data and the first edge data, generating:

second node data including a third component identifier corresponding to the second component, and updated first edge data associated with both the first node data and the second node data, the updated first edge data representing the first data type is to be output from the second component and input to the first component.

10. The computer-implemented method of claim 5, further comprising:

identifying a first location in a code base representing a first workflow in which a plurality of components are to process in response to a natural language input; and generating third data associating output of the graph representation with the first location.

11. The computer-implemented method of claim 10, further comprising:

generating fourth data associating the output of the graph representation with a second location of the code base corresponding to a commencement of NLU processing.

12. The computer-implemented method of claim 5, further comprising:

determining a plurality of orchestrator components comprising:

a first orchestrator component associated with first text-to-speech (TTS) parameters corresponding to a first synthesized voice, and a second orchestrator component associated with second TTS parameters corresponding to a second synthesized voice;

determining the first orchestrator component caused the graph representation to be generated; and based at least in part on determining the first orchestrator component caused the graph representation to be generated, using the first TTS parameters to generate output audio data.

13. A computing system, comprising:

at least one processor; and at least one memory comprising instructions that, when executed by the at least one processor, cause the computing system to:

receive first data representing a first natural language input;

prior to performing natural language understanding (NLU) processing, determine a first component is to execute with respect to the first natural language input, the first component to be invoked after NLU output data is generated for the first natural language input;

generate a graph representation of processing to be performed in response to the first natural language input, wherein generating the graph representation comprises:

generating a first graph portion representing the first component is to receive a first data type representing a context and the NLU output data, and is to output a component identifier representing a component configured to determine a response to the first natural language input, and after generating the first graph portion, generating a second graph portion representing a second component is to output the first data type;

perform NLU processing on the first data to generate first NLU output data representing the first natural language input;

based on the graph representation and at least partially in parallel to performing the NLU processing, cause the second component to execute to output second data corresponding to the first data type, the second data representing a first context;

process, using the first component, the second data and the first NLU output data to output a first component identifier indicating a third component configured to determine the response to the first natural language input; and cause the third component to process the first NLU output data to determine the response to the first natural language input.

14. The computing system of claim 13, wherein the at least one memory further comprising instructions that, when executed by the at least one processor, further cause the computing system to:

prior to receiving the first data, generate first workflow data representing processing capable of being performed in response to a natural language input, the first workflow data at least partially representing:

the first component receives the first data type and the NLU output data, and outputs the component identifier, the second component outputs the first data type, and a fourth component receives a third data type and outputs the NLU output data.

15. The computing system of claim 14, wherein:

the instructions to generate the first workflow data comprise instructions to generate the first workflow data to represent processing capable of being performed in response to a non-spoken natural language input; and the at least one memory further comprising instructions that, when executed by the at least one processor, further cause the computing system to generate second workflow data representing components capable of processing in response to a spoken natural language input.

16. The computing system of claim 14, wherein the at least one memory further comprising instructions that, when executed by the at least one processor, further cause the computing system to:

after receiving the first data, receive third data representing a fifth component outputs a fourth data type, wherein the fifth component is unrepresented in the first workflow data, wherein the instructions to generate the graph representation further comprise instructions to:

generate the first graph portion to represent the first component is to receive the fourth data type, and after generating the first graph portion, generate a third graph portion representing the fifth component is to output the fourth data type.

17. The computing system of claim 13, wherein:

the graph representation is a directed acyclic graph (DAG); and the instructions to generate the DAG further comprise instructions that, when executed by the at least one processor, further cause the computing system to:

generate first node data including a second component identifier corresponding to the first component, generate first edge data associated with the first node data, the first edge data representing the first data type is to be input to the first component, and after generating the first node data and the first edge data, generate:

second node data including a third component identifier corresponding to the second component, and updated first edge data associated with both the first node data and the second node data, the updated first edge data representing the first data type is to be output from the second component and input to the first component.

18. The computing system of claim 13, wherein the at least one memory further comprising instructions that, when executed by the at least one processor, further cause the computing system to:

identify a first location in a code base representing a first workflow in which a plurality of components are to process in response to a natural language input; and generate third data associating output of the graph representation with the first location.

19. The computing system of claim 18, wherein the at least one memory further comprising instructions that, when executed by the at least one processor, further cause the computing system to:

generate fourth data associating the output of the graph representation with a second location of the code base corresponding to commencement of NLU processing.

20. The computing system of claim 13, wherein the at least one memory further comprising instructions that, when executed by the at least one processor, further cause the computing system to:

determine a plurality of orchestrator components comprising:

a first orchestrator component associated with first text-to-speech (TTS) parameters corresponding to a first synthesized voice, and a second orchestrator component associated with second TTS parameters corresponding to a second synthesized voice;

determine the first orchestrator component caused the graph representation to be generated; and based at least in part on determining the first orchestrator component caused the graph representation to be generated, use the first TTS parameters to generate output audio data.

* * * * *